(12) United States Patent
Kirihara et al.

(10) Patent No.: US 10,050,359 B2
(45) Date of Patent: Aug. 14, 2018

(54) ROBOT

(71) Applicant: Seiko Epson Corporation, Tokyo (JP)

(72) Inventors: Daisuke Kirihara, Chino (JP); Daisuke Sato, Chino (JP)

(73) Assignee: Seiko Epson Corporation (JP)

( * ) Notice: Subject to any disclaimer, the term of this patent is extended or adjusted under 35 U.S.C. 154(b) by 33 days.

(21) Appl. No.: 14/524,290

(22) Filed: Oct. 27, 2014

(65) Prior Publication Data

US 2015/0114162 A1     Apr. 30, 2015

(30) Foreign Application Priority Data

Oct. 31, 2013   (JP) ................................ 2013-226541
Oct. 31, 2013   (JP) ................................ 2013-226543
Oct. 31, 2013   (JP) ................................ 2013-226544

(51) Int. Cl.
     *H01R 12/61*      (2011.01)
     *B25J 19/00*      (2006.01)
     *H01R 35/02*      (2006.01)

(52) U.S. Cl.
     CPC ........ *H01R 12/613* (2013.01); *B25J 19/0029* (2013.01); *H01R 35/025* (2013.01);
     (Continued)

(58) Field of Classification Search
     CPC ........ B25J 9/106; B25J 17/00; B25J 19/0029; B25J 19/0041; H02G 11/02; H02G 11/00; H01R 9/07; H01R 12/59; H01R 12/594; H01R 12/61; H01R 12/613; H01R 12/77; H01R 12/772; H01R 23/668; H01R 35/02; H01R 12/62; H05K 1/028; H05K 1/118; H05K 1/147; H05K 1/189; H05K 3/361; H05K 3/4635; H05K 7/1491;
     (Continued)

(56) References Cited

U.S. PATENT DOCUMENTS 3,959,608 A * 5/1976 Finlayson ............... B66F 9/205
                                                                 187/228
4,499,341 A * 2/1985 Boyd .................. B65H 75/4449
                                                                 191/12.4
(Continued)

FOREIGN PATENT DOCUMENTS

JP          05-020929 A     1/1993
JP          05-089404 A     4/1993
(Continued)

*Primary Examiner* — William C Joyce
*Assistant Examiner* — Randell J Krug
(74) *Attorney, Agent, or Firm* — Harness, Dickey & Pierce, P.L.C.

(57) ABSTRACT

A robot includes a joint as a first member, a link as a second member rotating around a third primary rotational axis in a bending and stretching manner with respect to the joint, a wiring board installed in the joint so that the first surface faces in a direction roughly perpendicular to the third primary rotational axis, and having a connector as a connection section to be connected to one end of an FPC as a flat cable disposed on the first surface, and a reel provided to the link, and formed by winding the other end side of the FPC around a rotational axis roughly parallel to the third primary rotational axis, and the FPC is connected to the first surface roughly perpendicularly to the first surface.

9 Claims, 11 Drawing Sheets

(52) U.S. Cl.
CPC ............ *Y10S 901/23* (2013.01); *Y10S 901/28* (2013.01); *Y10T 74/20311* (2015.01)

(58) Field of Classification Search
CPC ......... H05K 2201/05; H05K 2201/058; H05K 2201/2009; Y10T 74/20305; Y10T 74/20311; Y10S 901/15; Y10S 901/19; Y10S 901/23; Y10S 901/27; Y10S 901/28
USPC .............. 74/490.01, 490.02, 490.03, 490.05; 191/12.2 R, 12.4; 361/749; 901/27, 28, 901/29; 174/117 F, 72 R
See application file for complete search history.

(56) References Cited

U.S. PATENT DOCUMENTS

| | | | | |
|---|---|---|---|---|
| 5,210,378 | A * | 5/1993 | Tusques | B25J 19/0029 174/117 F |
| 5,286,219 | A * | 2/1994 | Ueno | H02G 11/00 439/15 |
| 5,794,487 | A * | 8/1998 | Solomon | B25J 9/042 277/378 |
| 5,829,307 | A * | 11/1998 | Harima | B25J 19/0029 414/918 |
| 5,944,543 | A * | 8/1999 | Tanaka | B60R 16/0215 439/164 |
| 6,056,571 | A | 5/2000 | Noro | |
| 6,125,715 | A * | 10/2000 | Nissfolk | B25J 17/0258 74/490.02 |
| 6,468,096 | B1 * | 10/2002 | Nagatsuka | B25J 19/0029 439/164 |
| 6,644,449 | B1 * | 11/2003 | Cummins | G11B 33/122 191/12 R |
| 6,842,585 | B2 * | 1/2005 | Matsuo | G02B 7/28 257/712 |
| 7,168,748 | B2 * | 1/2007 | Townsend | B25J 9/1612 294/106 |
| 7,573,728 | B2 * | 8/2009 | Chen | H05K 1/028 361/752 |
| 7,765,890 | B2 | 8/2010 | Inoue et al. | |
| 8,414,303 | B2 * | 4/2013 | Nakamura | B25J 19/0029 439/15 |
| 2004/0160748 | A1 | 8/2004 | Takagi et al. | |
| 2005/0193854 | A1 * | 9/2005 | Sanemasa | B25J 19/0029 74/490.02 |
| 2009/0208715 | A1 | 8/2009 | Stowell et al. | |
| 2011/0267798 | A1 * | 11/2011 | Nakazaki | H01L 37/0892 361/827 |
| 2013/0270399 | A1 * | 10/2013 | Berkowitz | B25J 19/0029 248/70 |
| 2016/0023359 | A1 * | 1/2016 | Saito | B25J 17/0258 74/490.06 |
| 2016/0248239 | A1 * | 8/2016 | Vaughan | H05K 5/0239 |
| 2016/0311120 | A1 * | 10/2016 | Goto | B25J 19/0029 |

FOREIGN PATENT DOCUMENTS

| | | |
|---|---|---|
| JP | 09-239682 A | 9/1997 |
| JP | 10-175189 A | 6/1998 |
| JP | 10-181051 A | 7/1998 |
| JP | 10-270130 A | 10/1998 |
| JP | 11-068338 A | 3/1999 |
| JP | 2003-046275 A | 2/2003 |
| JP | 2003-071773 A | 3/2003 |
| JP | 2003-230223 A | 8/2003 |
| JP | 2003-287173 A | 10/2003 |
| JP | 2004-222449 A | 8/2004 |
| JP | 2007-118176 A | 5/2007 |
| JP | 2007-220546 A | 8/2007 |
| JP | 2007-311521 A | 11/2007 |
| JP | 2008-027707 A | 2/2008 |
| JP | 2008-188699 A | 8/2008 |
| JP | 2008-277141 A | 11/2008 |
| JP | 2009-000770 A | 1/2009 |
| JP | 2010-214528 A | 9/2010 |
| JP | 2010-214530 A | 9/2010 |
| JP | 2012-045631 A | 3/2012 |
| WO | WO-2007-037130 A1 | 4/2007 |
| WO | WO 2015077953 A1 * | 6/2015 ......... B25J 19/0041 |

* cited by examiner

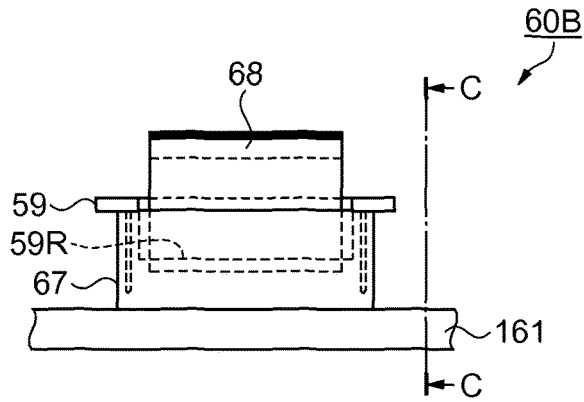 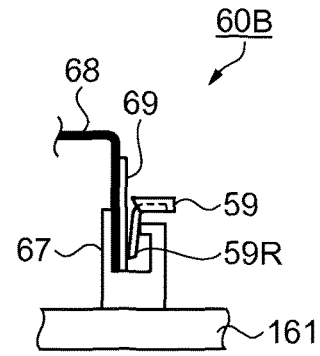
FIG. 6A  FIG. 6B
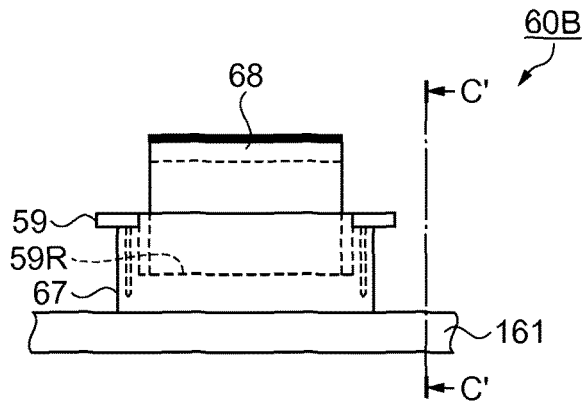 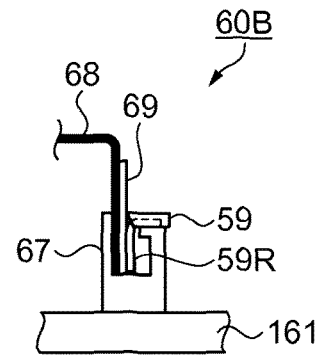
FIG. 6C  FIG. 6D
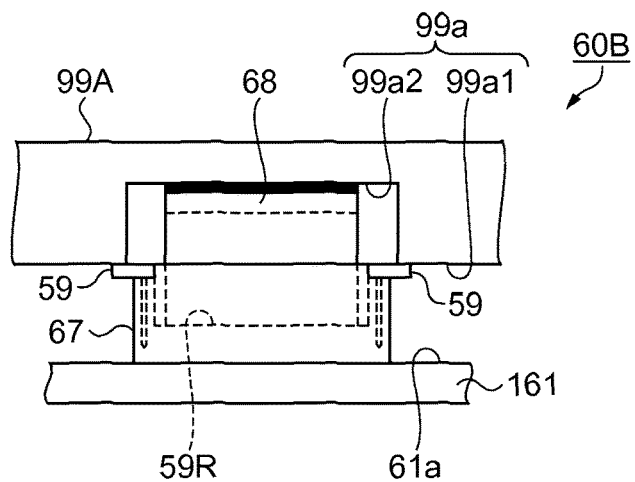
FIG. 6E

ROBOT

BACKGROUND

1. Technical Field

The present invention relates to a robot.

2. Related Art

In the past, industrial robots have widely been used for the purpose of automatization or laborsaving in operations such as an assembling process or a welding process of industrial products in manufacturing scenes such as factories. Further, in recent years, due to the fact that an operation process has been complicated in order to cope with miniaturization and increase in functionality of industrial products, there has been increasing the demand for robots with multiaxial control having an articulated arm including a plurality of members constituting a robot arm combined with each other so as to rotate relatively to each other using joint drive axes (rotational axes). In JP-A-2008-188699 (Document 1), for example, there is disclosed a dual-arm robot having six-axis articulated arms coupled on both sides of a base member (body). Such a six-axis articulated arm is composed of, for example, a shoulder section, an upper arm section, a forearm section, and a wrist section as members in order to realize a similar movement to the movement of a human arm. On the tip side of the member forming the wrist section of such an articulated arm, there is attached an end effector such as a robot hand for executing a predetermined operation to be performed by the robot.

In such a robot, there are installed cables for supplying power to electric motors forming drive sources of the members and the end effector connected adjacently to each other, and for transmitting and receiving control signals between the motors and a robot control section. As the wiring method in this case, there can be cited an internal wiring method for installing the cables inside the base member and the arm, and an external wiring method for installing the cables along the external surface of the robot, and it is conceivable that the internal wiring method is advantageous to the recent demand for the miniaturization of robots. In the wiring of the robot using the internal wiring method, it is required to adopt a wiring structure not hindering the relative rotational movement between the members (e.g., the base member and the arm, the arm and the arm, the arm and the wrist section) adjacent to each other and making a relative rotational movement in a joint section making a rotational movement.

In for example JP-A-2003-230223 (Document 2), there is introduced a wiring structure in which a first member and a second member making a relative rotational movement are connected to each other using a flat cable. Specifically, one end of the flat cable is connected to a first connector as a connection section provided to the first member, and the other end of the flat cable is connected to a second connector provided to the second member via a reel, which is provided to the second member, and around which the other end side of the flat cable is wound.

As described above, the flat cable having the both ends connected respectively to the first connector and the second connector can avoid such problems as breaking of wiring or early deterioration since a tensile force applied to the wiring is absorbed when the flat cable moves in a winding direction or a rewinding direction, in particular in the rewinding direction, following the relative rotational movement between the first member and the second member in the reel portion around which the flat cable is wound.

In JP-A-2010-214530 (Document 3), for example, there is introduced a wiring structure for a rotating joint (a rotary joint) in which in the wiring structure for connecting the first member and the second member making a relative rotational movement to each other using a flat cable (a flexible printed circuit (FPC) board), a flat cable having one end connected to the first member is connected to a core member in the other end side, a reel having a further part of the other end side of the flat cable wound around the core member outward is formed, and the other end of the flat cable is connected to the second member or the end effector coupled to the tip side of the second member via the reel.

According to this wiring structure, the flat cable connecting the first member and the second member to each other can avoid such problems as breaking of wiring or early deterioration since the tensile force applied to the wiring is absorbed when the flat cable moves in the winding direction or the rewinding direction, in particular in the rewinding direction, following the relative rotational movement between the first member and the second member in the reel portion around which the flat cable is wound.

However, in the internal wiring structure described in Document 2, the first connector and the second connector are disposed so that the inserting directions of the flat cable are opposed roughly in parallel to each other. Therefore, if a force in the tensile direction occurs in the flat cable in the connection section between each of the first and second connectors and the flat cable, it results that a force in a direction in which the flat cable is pulled out from the connector is applied, and therefore, there is a problem that a connection failure due to loose or dropout of the connection section of the flat cable might be incurred.

Further, in the internal wiring structure described in Document 2, in the case of adopting a configuration of installing a plurality of flat cables in an overlapping manner, since a large space for arranging a plurality of connectors in parallel to each other becomes necessary in each of the first connector side and the second connector side, there is a problem that it is disadvantageous to miniaturization of the robot.

Further, although not clearly described in the wiring structure of the robot described in Document 2, a relay board is provided with a third connector connected to the second connector, and the flat cable connected to the third connector is connected to the end effector (an operating member) to thereby constitute the wiring structure with the flat cable between the first member and the end effector via the relay board. By relaying the wiring between the first member and the end effector by the relay board in such a manner, complication of an arrangement of the flat cable and increase in cost due to increase in length of the flat cable can be avoided.

Here, in order to form the relay wiring structure of the flat cable using the relay board in the wrist section (the second member), in which the miniaturization is particularly marked due to progress in miniaturization of robots, it is necessary to devise an arrangement of the connectors provided to the relay board, arrangement paths of the flat cables connected to the connectors, and so on.

However, in the wiring structure of the robot described in Document 2, the arrangement of the connectors, the arrangement paths of the flat cables between the members and the operation sections are not clearly specified. Therefore, there is a problem that there is a possibility that it becomes difficult to incorporate the relay wiring structure into the second member, or the connection becomes unstable and the reliability is degraded due to an unreasonable arrangement of the flat cables.

In achieving the miniaturization of the robot having an articulated arm such as a six-axis arm, the miniaturization of the wrist section to which the end effector is attached on the tip side is a dominant factor. Therefore, in the wiring structure forming the reel described in Document 3, since the space for arranging the wiring on the operating member side of the reel is limited, it is necessary to devise the wiring paths.

However, since there is no specific description of the wiring path of the flat cable on the operating member side of the reel in Document 3, there is a problem that the arrangement path of the wiring using the flat cable on the foreside of the wrist section of the articulated arm becomes complicated, or it becomes necessary to perform a complicated work on the member of the wrist section in order to provide the wiring path.

SUMMARY

An advantage of some aspects of the invention is to solving at least a part of the problems described above, and the invention can be implemented as the following forms or application examples.

Application Example 1

A robot according to this application example includes a first member, a second member rotating around a primary rotational axis with respect to the first member, and a wiring board provided to the first member and having a connection section connected to one end of a flat cable, the other end of the flat cable is fixed to the second member, and a direction of a tension acting on the other end of the flat cable when a tension acts on the one end of the flat cable is different from an insertion direction of the flat cable in the connection section.

According to this application example, it becomes difficult for the one end of the flat cable to be pulled out from the connection section when the tension occurs on the other end side of the flat cable due to the relative rotational movement between the first member and the second member compared to the case in which the insertion direction of the one end of the flat cable in the connection section disposed on the first member is the same direction as the direction of the tension acting on the other end of the flat cable. Therefore, it is possible to provide a robot having a wiring structure high in connection reliability with respect to the relative rotational movement between the first member and the second member.

Application Example 2

In the robot according to the application example described above, it is preferable that the connection section is disposed on a first surface of the wiring board, which is a surface roughly perpendicular to the primary rotational axis, and the insertion direction of the flat cable in the connection section is different from a direction parallel to the first surface.

In this application example, the direction parallel to the first surface denotes a direction roughly perpendicular to the primary rotational axis, and therefore, the same direction as the direction of the tension when the tension occurs in the other end of the flat cable in the relative rotational movement around the primary rotational axis between the first member and the second member. According to this application example, since the insertion direction of the flat cable in the connection section is different from the direction parallel to the first surface described above, it becomes difficult for the flat cable to be pulled out in the connection section. Therefore, the robot having the wiring structure high in reliability can be provided.

Application Example 3

In the robot according to the application example described above, it is preferable that the insertion direction of the flat cable in the connection section is a direction roughly perpendicular to the first surface.

The term "roughly perpendicular" in the application example has the meaning including a configuration in which the insertion direction intersects with the first surface at an angle in a range of 85° through 95° in addition to the configuration in which the insertion direction is completely perpendicular to (at an angle of 90° with) the first surface.

According to this application example, since the insertion direction of the one end of the flat cable in the connection section is set to a direction roughly perpendicular to the first surface, there is obtained a marked effect of making it more difficult for the one end of the flat cable connected to the connection section to be pulled out when the tension occurs in the direction toward the other end of the flat cable.

Therefore, in the joint structure in which the first member and the second member make a relatively rotational movement, the wiring structure high in reliability can be provided.

Application Example 4

In the robot according to the application example described above, it is preferable that a lid member having an inner wall surface opposed to the first surface is installed to the first member, and the inner wall surface has contact with the flat cable in a vicinity of the connection section.

According to this application example, since it results that the inner wall surface of the lid member always applies a force for pressing the flat cable against the connection section, there is provided an effect of making it more difficult for the flat cable to be pulled out from the connection section.

Application Example 5

In the robot according to the application example described above, it is preferable that a plurality of flat cables are installed between the connection sections and a reel in an overlapping manner, and the connection sections are arranged side by side so that longitudinal directions of the connection sections are perpendicular to an extending direction of the flat cables toward the connection sections.

According to this application example, compared to the configuration in which the flat cables are connected in parallel to the first surface of the board in the connection sections, the plurality of connection sections can be installed with a reduced space, and at the same time, when connecting the flat cables to the connection sections, interference between the connection sections adjacent to each other can be suppressed to improve workability. Therefore, it is possible to provide the robot, which is small in size and good in assemble operation efficiency.

Application Example 6

In the robot according to the application example described above, it is preferable that a rotational center axis of the reel and centers of the respective connection sections are aligned with each other in a planar view of the first surface.

According to this application example, it is possible to realize the wiring structure related to the first member and the second member using the plurality of flat cables, which is more space-saving, and does not cause unwanted deformation such as bend in the flat cables.

Application Example 7

In the robot according to the application example described above, it is preferable that the robot includes a reinforcing member harder than the flat cable disposed on a connection terminal section of the flat cable to be connected to the connection section.

According to this application example, since the rigidity of the connection part of the flat cable increases, the connection operation is easy to perform, and the connection reliability can be improved. Further, since the vicinity of the reinforcing member of the flat cable in the connection section can be pressed by the lid member, it is possible to keep the flat cable in the connection section while reducing the stress on the flat cable.

Application Example 8

In the robot according to the application example described above, it is preferable that the connection section includes a lock lever adapted to lock the flat cable by being pressed into the connection section in the insertion direction after inserting the flat cable, and the inner wall surface has contact with the lock lever.

According to this application example, since the lock lever in the state of locking the flat cable is held by the lid member, there is obtained an effect of further improving the connection reliability of the flat cable in the connection section.

Application Example 9

In the robot according to the application example described above, it is preferable that the inner wall surface has concavity and convexity including a projection section projecting toward the first surface, and the projection section has contact with one of the reinforcing member, the lock lever, and the reinforcing member and the lock lever.

According to this application example, since it is possible to press the reinforcing member or the lock lever with the projection section among the concavity and convexity provided to the inner wall surface of the lid member, and press the flat cable with the recessed section, in the flat cable pressing structure using the lid member, the connection reliability of the connection section can be improved while suppressing the stress applied on the flat cable.

Application Example 10

In the robot according to the application example described above, it is preferable that a plurality of the flat cables includes at least a flat cable for a power line and a flat cable for a signal line, and the flat cable for the power line overlaps the flat cable for the signal line so as to have a larger distance than the flat cable for the signal line, and one of an insulating member and a shield member having a shape similar to the flat cable is disposed between the flat cable for the power line and the flat cable for the signal line.

According to this application example, it is possible to suppress a harmful influence such as heat generated from the power line or the electric interference exerted by the electron beam on other electronic circuits and signal lines formed on the wiring board.

Application Example 11

A robot according to this application example includes a base member, and an articulated arm including a plurality of members wherein the members adjacent to each other are coupled to each other with a joint mechanism so as to rotate relatively to each other, the articulated arm is coupled so as to rotate around a shoulder axis intersecting with a surface of the base member, the members adjacent to each other are coupled to each other so as to rotate around either of a primary rotational axis intersecting with the shoulder axis and a secondary rotational axis roughly perpendicular to the primary rotational axis, the primary rotational axis includes first through n-th primary rotational axes (n represents an integer no smaller than 3) disposed in this order from the base member, the members include a first member and a second member rotating around the n-th primary rotational axis with respect to the first member, a wiring board having a connection section connected to one end of a flat cable is provided to the first member, the other end of the flat cable is fixed to the second member, and a direction of a tension acting on the other end of the flat cable when a tension acts on the one end of the flat cable is different from an insertion direction of the flat cable in the connection section.

According to this application example, in the joint structure between the wrist section (the second member) to be the particularly dominant factor in achieving the miniaturization of the robot having the articulated arm and the member (the first member) to be coupled on the base member side of the wrist section, it is possible to provide the wiring structure difficult for the one end of the flat cable to be pulled out from the connection section when the tension occurs on the other end side of the flat cable due to the relative rotational movement between the first member and the second member. Therefore, it is possible to provide the multiaxial robot, which is small in size and high in reliability.

Application Example 12

In the robot according to the application example described above, it is preferable that the connection section is disposed on a first surface of the wiring board, which is a surface roughly perpendicular to the primary rotational axis, and the insertion direction of the flat cable in the connection section is different from a direction parallel to the first surface.

According to this application example, in the joint structure of the wrist section which is a dominant factor to the miniaturization of the robot having the articulated arm, the direction different from the "direction parallel to the first surface" which is the same direction as the direction of the tension when the tension occurs in the other end of the flat cable is set to the insertion direction of the one end of the flat cable in the connection section. Therefore, since it becomes difficult for the flat cable to be pulled out in the connection section, it is possible to make a contribution to the provision of the multiaxial robot having a reliable wiring structure.

Application Example 13

In the robot according to the application example described above, it is preferable to include a base member, and an articulated arm including a plurality of members wherein the members adjacent to each other are coupled to each other with a joint mechanism so as to rotate relatively to each other, wherein the articulated arm is coupled so as to rotate around a shoulder axis intersecting with a surface of the base member, the members adjacent to each other are coupled to each other so as to rotate around either of a secondary rotational axis roughly parallel to the shoulder axis and a primary rotational axis roughly perpendicular to the secondary rotational axis, the primary rotational axis includes first through n-th primary rotational axes disposed in this order from the base member, the members include a first member and a second member rotating around the n-th primary rotational axis with respect to the first member, there are included a wiring board installed in the first member so that the first surface faces in a direction perpendicular to the n-th primary rotational axis, and having a connection section to be connected to one end of the flat cable disposed on the first surface, and a reel provided to the second member, and formed by winding the other end side of the flat cable, and the flat cable is connected roughly perpendicularly to the first surface.

According to this application example, in the joint structure of the wrist section to be the dominant factor to the miniaturization of the robot having the articulated arm, since the insertion direction of the one end of the flat cable in the connection section is set to a direction roughly perpendicular to the first surface, there is obtained a marked effect of making it more difficult for the one end of the flat cable connected to the connection section to be pulled out when the tension occurs in the direction toward the other end of the flat cable.

Therefore, in the joint structure in which the first member and the second member make a relatively rotational movement, the multiaxial robot having the wiring structure high in reliability can be provided.

Application Example 14

A robot according to this application example includes a first member, a second member rotating around a primary rotational axis with respect to the first member, an operating member coupled to the second member, a first flat cable and a second flat cable each having one end connected to the first member, a reel provided to the second member, and formed by winding the other end side of each of the first flat cable and the second flat cable around a rotational axis roughly parallel to the primary rotational axis, a relay board provided to the second member, and having a first connection section to which the other end of the first flat cable from the reel is connected, a second connection section to which the other end of the second flat cable from the reel is connected, a third connection section connected to the first connection section via a first connection line, and a fourth connection section connected to the second connection section via a second connection line, a third flat cable having one end connected to the third connection section and the other end connected to the operating member, and a fourth flat cable having one end connected to the fourth connection section and the other end connected to the operating member, and the first through fourth connection sections are disposed two by two on a first surface and a second surface, both surfaces of the relay board so that the first through fourth flat cables are connected roughly in parallel to one of the first surface and the second surface.

In the application example, "roughly parallel" has the meaning including a configuration intersecting within a range of 10° in addition to a totally parallel configuration.

According to this application example, in the wiring structure for connecting the first member and the operating member coupled to the second member rotating with respect to the first member to each other with the flat cables while relaying with the relay board provided to the second member, there is clarified the arrangement of the connection sections of the relay board for relaying the wiring with a reduced space while absorbing the tension with the reel so that the rotation of the second member with respect to the first member is not hindered by the flat cables. In particular, since the first through fourth connection sections are arbitrarily disposed two by two on the first surface and the second surface, namely the both surfaces of the relay board, and further, the first through fourth flat cables are disposed so as to be connected roughly in parallel to the first surface or the second surface, the wiring using the flat cables can be relayed with a reduced space.

Application Example 15

A robot according to this application example includes a base member, and an articulated arm including a plurality of members wherein the members adjacent to each other are coupled to each other with a joint mechanism so as to rotate relatively to each other, the articulated arm is coupled so as to rotate around a shoulder axis intersecting with a surface of the base member, the members adjacent to each other are coupled to each other so as to rotate around either of a primary rotational axis intersecting with the shoulder axis and a secondary rotational axis roughly perpendicular to the primary rotational axis, the primary rotational axis includes first through n-th primary rotational axes disposed in this order from the base member, the members includes a first member located on the base member side and coupled using the n-th primary rotational axis, and a second member rotating around the n-th primary rotational axis with respect to the first member, there are included an operating member coupled to the second member, a first flat cable and a second flat cable each having one end connected to the first member, a reel provided to the second member, and formed by winding the other end side of each of the first flat cable and the second flat cable around a rotational axis roughly parallel to the primary rotational axis, a relay board provided to the second member, and having a first connection section to which the other end of the first flat cable from the reel is connected, a second connection section to which the other end of the second flat cable from the reel is connected, a third connection section connected to the first connection section via a first connection line, and a fourth connection section connected to the second connection section via a second connection line, a third flat cable having one end connected to the third connection section and the other end connected to the operating member, and a fourth flat cable having one end connected to the fourth connection section and the other end connected to the operating member, and the first through fourth connection sections are disposed two by two on a first surface and a second surface, both surfaces of the relay board so that the first through fourth flat cables are connected roughly in parallel to one of the first surface and the second surface.

According to this application example, in the robot having the articulated arm, it is possible to provide the wiring structure advantageous to the miniaturization of the joint structure between the wrist section (the second member) to be the dominant factor in particular to the miniaturization and the member (the first member) coupled on the base member side of the wrist section. Therefore, the small-sized highly-functional multiaxial robot can be provided.

Application Example 16

In the robot according to the application example described above, it is preferable that the first through fourth connection sections are disposed nearer to the operating member than one of the primary rotational axis and the n-th primary rotational axis.

According to this application example, in the wiring structure for achieving the connection between the first member and the operating member while relaying the flat cables with the relay board, there is clarified the arrangement advantageous to the space reduction of the relay board and the first through fourth connection sections disposed on the relay board.

Application Example 17

In the robot according to the application example described above, it is preferable that the first connection section and the third connection section are disposed on the first surface, the second connection section and the fourth connection section are disposed on the second surface, and the third flat cable and the fourth flat cable are installed toward the operating member while passing by the first surface.

According to this application example, in the wiring structure for achieving the connection between the first member and the operating member while relaying the flat cable with the relay board, there can be clarified a configuration of relaying the wiring of the flat cables with reduced space. In particular, it is possible to provide the wiring structure suppressing the bending angle of the fourth flat cable among the third flat cable and the fourth flat cable connected to the third connection section or the fourth connection section and folded back toward the first surface.

Application Example 18

In the robot according to the application example described above, it is preferable that the second connection section and the fourth connection section are disposed on the first surface, the first connection section and the third connection section are disposed on the second surface, the first connection section, the second connection section, and the third connection section are disposed with respective connection ports facing in the same direction, and the fourth connection section is disposed with a connection port facing in an opposite direction to the direction of the connection ports of the first connection section, the second connection section, and the third connection section.

According to this application example, in the wiring structure for achieving the connection between the first member and the operating member while relaying the flat cable with the relay board, there can be clarified a configuration of relaying the wiring of the flat cables with reduced space. In particular, the banding angle of the third flat cable connected to the third connection section and folded back toward the first surface can be suppressed, and the fourth flat cable connected to the fourth connection section can be installed on the operation member side with little bend.

Application Example 19

In the robot according to the application example described above, it is preferable that the first flat cable and the third flat cable are wiring for a power line, and the second flat cable and the fourth flat cable are wiring for a signal line.

In general, since the wiring pattern provided to the flat cable for signal line is thinner compared to the flat cable for the power line provided with a relatively thick wiring line, a crack or breaking easily occurs when bending the flat cable.

In either of the application examples described above, the wiring arrangement is provided so that the second flat cable and the fourth flat cable for the signal line are arranged to have a larger bending radius of the flat cable than the first flat cable and the third flat cable for the power line, or arranged to have a wiring shape with no bend. Therefore, according to this application example, it is possible to provide the wiring structure difficult for the crack or the breaking to occur between the members of the robot coupled to each other.

Application Example 20

In the robot according to the application example described above, it is preferable that the first connection section and the second connection section are disposed either of the first surface and the second surface, the third connection section is disposed on a surface opposite to the surface on which the first connection section is disposed, and is connected to the first connection section via the first connection line including a through hole, the fourth connection section is disposed on a surface opposite to the surface on which the second connection section is disposed, and is connected to the second connection section via the second connection line including a through hole, and the first through fourth connection sections are disposed with the respective connection ports facing in the same direction.

According to this application example, in the wiring structure for achieving the connection between the first member and the operating member while relaying the flat cable with the relay board, there can be clarified a configuration of relaying the wiring of the flat cables with reduced space. In particular, since it is possible to install the third flat cable connected to the third connection section and the fourth flat cable connected to the fourth connection section toward the operation member with little bend, a small-sized highly reliable wiring structure of the robot can be provided.

Application Example 21

A robot according to this application example includes a first member, a second member rotating around a primary rotational axis with respect to the first member, a flat cable having one end connected to a first surface of the first member roughly perpendicular to the primary rotational axis, and is disposed so as to extend toward the second member with a principal surface kept parallel to the first surface, a connection section to which the other end of the flat cable is connected via a wiring path in which the principal surface of the flat cable is disposed in parallel to a second surface of the second member as a surface roughly parallel to the first surface, and a reel disposed between one end of the flat cable of the second member and the wiring path, including a core member having a cylindrical shape disposed roughly perpendicularly to the second surface, a cover member disposed so as to surround a cylindrical side surface of the core member, and the other end side of the flat cable wound around the core member, and a part of the wiring path is located between the flat cable of the reel and the second surface.

In the application example, "roughly parallel" has the meaning including a configuration intersecting within a range of 10° in addition to a totally parallel configuration. Further, "roughly perpendicular" has the meaning including a configuration intersecting within a range of 10° (85° through) 95° in addition to a totally perpendicular configuration.

According to this application example, in the second member in which the space for the wiring path is limited due to the miniaturization of the robot, the flat cable is installed in a space between the flat cable wound around the reel and the second surface to form a part of the wiring path. Thus, in the limited space of the rotational joint (rotary joint) structure using the first member and the second member, the wiring path of a part of the flat cable nearer to the operating member than the reel is made clear, and the wiring structure using the flat cable from the first member to the second to which the operating member is coupled can be provided with a reduced space.

Application Example 22

A robot according to this application example includes a base member, and an articulated arm including a plurality of members wherein the members adjacent to each other are coupled to each other with a joint mechanism so as to rotate relatively to each other, the articulated arm is coupled so as to rotate around a shoulder axis intersecting with a surface of the base member, the members adjacent to each other are coupled to each other so as to rotate around either of a primary rotational axis intersecting with the shoulder axis and a secondary rotational axis roughly perpendicular to the primary rotational axis, the primary rotational axis includes first through n-th primary rotational axes disposed in this order from the base member, the members include a first member on the base member side coupled with the n-th primary rotational axis and a second member rotating around the n-th primary rotational axis with respect to the first member, there are included a flat cable having one end connected to a first surface of the first member roughly perpendicular to the primary rotational axis, and is disposed so as to extend toward the second member with a principal surface kept parallel to the first surface, a connection section to which the other end of the flat cable is connected via a wiring path through which the flat cable passes keeping principal surface of the flat cable parallel to a second surface of the second member as a surface having roughly the same direction as the first surface, and a reel disposed between one end of the flat cable of the second member and the wiring path, including a core member having a cylindrical shape disposed roughly perpendicularly to the second surface, a cover member disposed so as to surround a cylindrical side surface of the core member, and the other end side of the flat cable wound around the core member, and a part of the wiring path is located between the flat cable of the reel and the second surface.

According to this application example, in the robot having the articulated arm, since it is possible to provide the space-saving wiring structure corresponding to the miniaturization of the joint structure between the wrist section (the second member), which is a dominant factor in particular for the miniaturization), and the member (the first member) to be coupled on the base member side of the wrist section, it is possible to make a contribution to realization of the small-sized highly-functional multiaxial robot.

Application Example 23

In the robot according to the application example described above, it is preferable that the wiring path includes a recessed section on the second surface.

According to this application example, even in the case in which the space between the flat cable wound around the reel and the second surface is narrow, the wiring path of the flat cable can be formed, and it is possible to guide the flat cable with the recessed section.

Application Example 24

In the robot according to the application example described above, it is preferable that an operating member adapted to perform a predetermined operation is disposed on a third surface which is an opposite surface of the first member viewed from an axial direction of the primary rotational axis, and is roughly parallel to the primary rotational axis, the connection section is disposed one of on a fourth surface roughly perpendicular to a direction in which the third surface makes the bending and stretching rotational movement, and in a vicinity of the fourth surface, a sub-operating member connected to the connection section and adapted to perform an auxiliary operation of a predetermined operation performed by the operating member is provided to the fourth surface, and a first imaginary line connecting an operation center to be a base point of the operation of the operating member and the primary rotational axis and a second imaginary line connecting an operation center to be a base point of the operation of the sub-operating member and the primary rotational axis are roughly perpendicular to each other.

In this application example, the auxiliary operation performed by the sub-operating member denotes, for example, an operation of performing control of detecting the position and the state of the operation target prior to the predetermined operation (principal operation) performed by the operating member, and then reflecting the detection information on the operation of the operating member, or an operation of washing, pressing, or gripping the operation target before, after, or before and after the operation performed by the operating member.

According to this application example, in the robot equipped with the articulated arm, for example, by rotating only the primary rotational axis coupling the first member and the second member to each other, it is possible to move each of the operating member and the sub-operating member to the operation starting point where the operation target is mounted. Therefore, compared to the case of moving the operating member and the sub-operating member to the operation starting point by operating a number of rotary shafts using the offset correction, the time for moving to the operation starting point can be reduced, and the positioning accuracy of the operating member and the sub-operating member to the operation target can be improved.

Further, since the wiring path with a reduced space from the reel to the operating member or the sub-operating member in the application examples described above is applied, there is provided an effect on the miniaturization of the highly-functional robot equipped with the sub-operating member.

Application Example 25

In the robot according to the application example described above, it is preferable that the sub-operating member is an imaging device taking the second imaginary line as an optical axis, and there is provided a control section adapted to operate the operating member based on the imaging information of the operation target obtained by the imaging device.

According to this application example, for example, it is possible to provide a robot of rotating only the primary rotational axis based on the positional information of the operation target obtained by the imaging device to move the operating member to the operation starting position with positional accuracy and in a short time, and making the operating member perform a predetermine operation.

BRIEF DESCRIPTION OF THE DRAWINGS

The invention will be described with reference to the accompanying drawings, wherein like numbers reference like elements.

FIGS. 6A through 6E are diagrams showing an electric component mounting section of a robot according to a second embodiment of the invention, wherein FIG. 6A is a schematic side view showing a state before a lock lever of a connector as a connection section is locked, FIG. 6B is a schematic cross-sectional view along the C-C line shown in FIG. 6A, FIG. 6C is a schematic side view showing a state in which the lock lever of the connector is locked, FIG. 6D is a schematic cross-sectional view along the C'-C' line shown in FIG. 6C, and FIG. 6E is a partial schematic diagram showing a state in which a lid member is attached in the state shown in FIG. 6C.

FIGS. 11A and 11B are diagrams showing details of a wiring relay section of a fourth embodiment of the invention in an enlarged manner, wherein FIG. 11A is partial cross-sectional view schematically showing a cross-section of the wiring relay section in a part where the cross-section of a second connection line can be viewed, and FIG. 11B is a partial cross-sectional view schematically showing a cross-section of the wiring relay section of a part where the cross-section of a first connection line can be viewed.

FIGS. 15A and 15B are diagrams schematically showing a reel of the robot according to the fifth embodiment and a wiring path from the reel to a camera as a sub-operating member, wherein FIG. 15A is a partial enlarged side view viewing a second surface side, and FIG. 15B is a partial enlarged plan view viewed from a direction of the arrow A shown in FIG. 15A.

DESCRIPTION OF EXEMPLARY EMBODIMENTS

Some embodiments of a robot according to the invention will hereinafter be explained with reference to the accompanying drawings. It should be noted that the drawings used are shown with appropriate expansion or contraction so that parts to be explained becomes in a recognizable state.

First Embodiment

General Configuration of Robot

Figure 1:
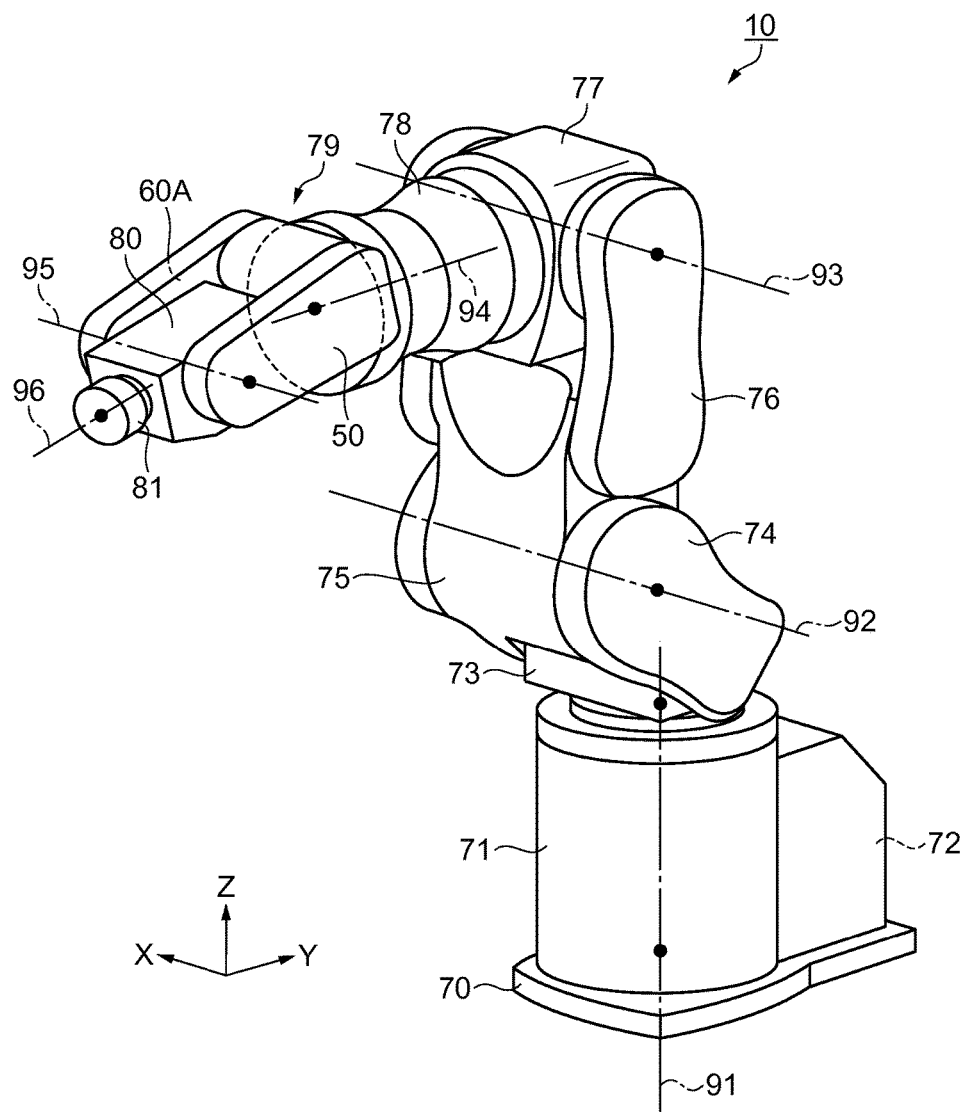
FIG. 1 is a perspective view schematically showing a general configuration of a robot according to a first embodiment of the invention.

Firstly, a general configuration of a robot according to a first embodiment will be explained. FIG. 1 is a perspective view schematically showing the general configuration of the robot according to the present embodiment. It should be noted that a "rotation" in the embodiment denotes a normal rotation and a reverse rotation.

The robot 10 shown in FIG. 1 is a six-axis vertical articulated robot having six rotational axes as basic drive axes, and has configuration in which a plurality of links (arms) as arm members is connected in series using joints (articulations) as arm members in a height direction (a Z axis) in imitation of a structure of a human arm, and is therefore high in flexibility, and can perform complicated operations.

The robot 10 includes a bottom section 70 and a main body section 71 as a base member, a control section 72, and an articulated arm having a joint 73, a link 74, a joint 75, a link 76, a joint 77, a link 78, a joint 79, a link 80, and a link 81 to be attached with an end effector (not shown) as members, and having the links, the link and/or the joint, and the joints adjacent to each other rotatably coupled to each other using an articulated mechanism.

The bottom section 70 is a pedestal of the robot 10, and is firmly fixed to a plane such as a floor of a work space or a workbench in a factory using a plurality of bolts (screws). It should be noted that the fixation position is not limited to a horizontal plane (a plane including an X axis and a Y axis), but can also be a surface of a movable wagon, a wall surface, a ceiling, or an arm coupling section provided to a robot unit described later as long as the strength sufficient for bearing with the weight of the robot 10 and the vibration thereof is provided.

Although not shown in the drawings, the control section 72 is also provided with interface terminals such as RS232C or universal serial bus (USB) for inputting an operation program in addition to the operation panel for operating the robot 10. Alternatively, there can also be adopted a configuration provided with an interface device such as a wireless local area network (LAN) terminal or an infrared transceiver.

It should be noted that the control section 72 can also be disposed separately from the robot main body.

On the main body section 71, there are disposed the joint 73 and the link 74 in this order.

Firstly, an articulated arm structure (from the arm to the hand) from the joint 73 to the link 80 of the robot 10 pivots in a horizontal direction around a shoulder axis 91 penetrating the main body section 71 in the Z-axis direction. In other words, the joint 73 denotes a rotary shaft intersecting with a surface on which the articulated arm of the main body section 71 is coupled, and forms a rotational axis roughly perpendicular to the surface of the main body section 71 in the present embodiment.

Further, the link 81 to be attached with the end effector is one end (termination) in the articulated arm structure, and the joint 73 attached to the main body section 71 (on the bottom section 70 side) corresponds to the other end (base) in the robot arm structure. It should be noted that in the following explanation, there are also used the expressions of a "termination side" as a side near to the link 81 in the robot arm structure, and a "base side" as a side near to the bottom section 70.

Further, the main body section 71 incorporates an electric motor for rotationally driving the robot arm structure, a reduction mechanism including a plurality of gears, and so on. Further, an electric motor for driving the corresponding link or end effector, a reduction mechanism, and so on are incorporated in the vicinity of each of the rotational axes explained hereinafter.

On the termination side of the link 74 disposed so as to extend from the termination side of the joint 73, there is combined the joint 75. The joint 75 is driven so as to rotate around a first primary rotational axis 92, which is a primary rotational axis roughly perpendicular to the shoulder axis 91, and penetrates the link 74 in the X-axis direction. The first primary rotational axis 92 is located on the termination side of the link 74. Here, "roughly perpendicular" is defined to include a configuration intersecting within a range of 10° (a range of 85° through 95°) in addition to a totally orthogonal configuration.

It should be noted that in the articulated arm of the present first embodiment, primary rotational axes roughly parallel to the first primary rotational axis 92 are denoted with serial numbers of first through n-th primary rotational axes from the main body side in this order. Here, "roughly parallel" is defined to include a configuration intersecting within a range of 10° in addition to a totally parallel configuration.

Further, since the extending direction of the rotational axis varies when the robot 10 operates (e.g., in the case of pivoting around the shoulder axis 91), the form of the articulated arm shown in FIG. 1 is defined as an initial state, and the explanation will be presented on the premise of the state installed in the initial state.

The link 76 is disposed so as to extend from the termination side of the joint 75.

The joint 77 is combined with the termination side of the link 76, and the link 78 is further assembled to the termination side of the joint 77. The link 78 is disposed so as to extend from the termination side of the joint 77. The joint 77 to which the link 78 is assembled is driven around the second primary rotational axis 93 penetrating the termination side of the link 76 in the X-axis direction.

Further, the joint 79 having a drive transmission section 50 and an electric component mounting section 60A is combined with the termination side of the link 78. The joint 79 is driven so that the joint 79 rotates with respect to the link 78 around a secondary rotational axis 94 penetrating the termination side of the link 78 side in the Y-axis direction. The secondary rotational axes of the robot 10 including the secondary rotational axis 94 are rotational axes perpendicular to the primary rotational axes of the robot 10 such as the first primary rotational axis 92.

Further, the link 80 is combined with the termination side of the joint 79, and the link 80 is driven around a third primary rotational axis 95 penetrating the termination side of the joint 79 in the X-axis direction.

As described above, the primary rotational axes of the articulated arm of the robot 10 according to the present embodiment include the first primary rotational axis 92, the second primary rotational axis 93, and the third primary rotational axis 95 in this order from the main body section 71 as the base member. In other words, the n-th primary rotational axis as set forth in Application Example 11 according to the invention denotes the third primary rotational axis 95. Therefore, among the joint 79 and the link 80 as the members coupled so as to rotate around the third primary rotational axis 95, the joint 79 denotes the first member as set forth in the application examples, and the link 80 denotes the second member as set forth in the application examples. The link 80 as the second member corresponds to the wrist section in the articulated arm of the robot 10.

On the termination side of the link 80, there is disposed the link 81 so as to extend from the link 80. The link 81 is driven on the termination side of the link 80 so that the link 81 rotates in the torsional direction with respect to the link 80 around the Y-axis direction along the extending direction of the link 81 from the link 80, namely a secondary rotational axis 96 penetrating roughly the center of the link 81 having a cylindrical shape.

As described above, on the termination side of the articulated arm, there is combined the end effector as a mechanism for executing a predetermined operation to be performed by the robot 10 (not shown). As the end effector, there can be used those having a variety of types of configurations in accordance with the intended use of the robot 10. For example, by attaching a grip mechanism such as a robot hand for gripping a component of a manufacture, or a tool for performing a process such as soldering or welding to the termination side of the link 81, the robot 10 can be used as those for performing a variety of operations.

Drive Transmission Section (Joint Drive Mechanism)

Figure 2:
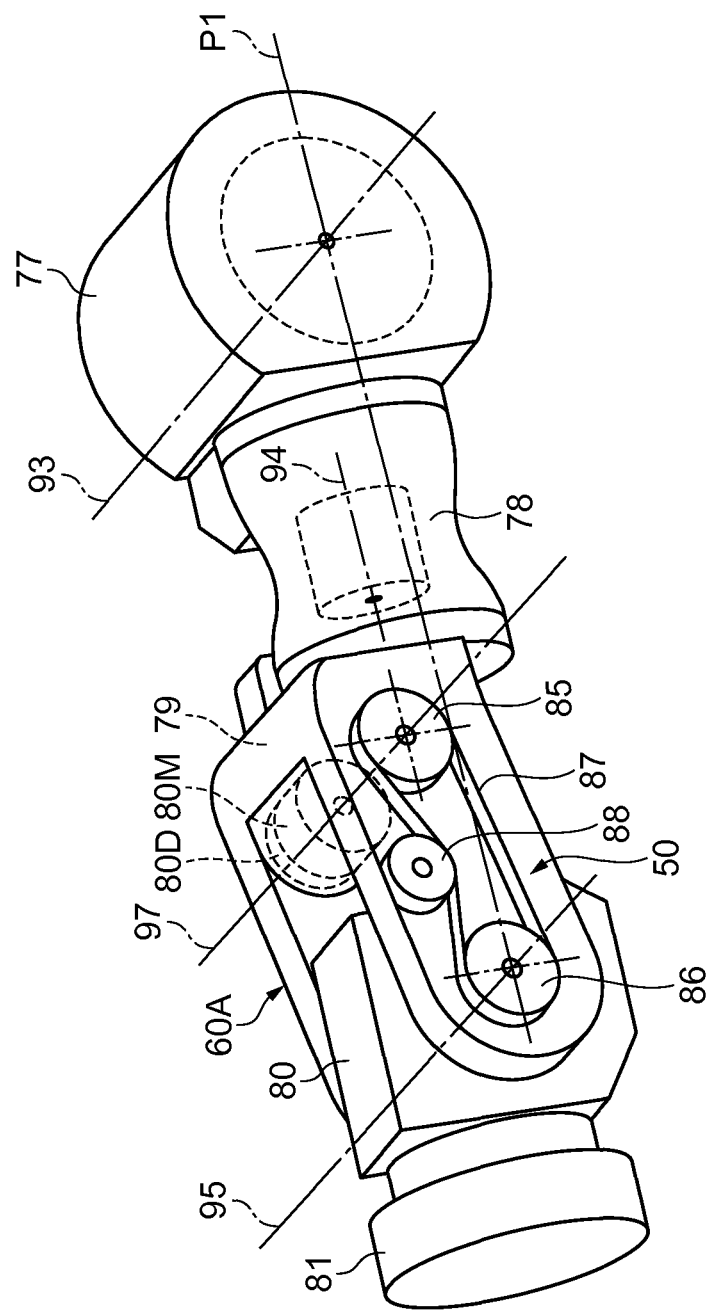
FIG. 2 is a perspective view schematically showing a structure of a drive transmission section of the robot according to the first embodiment.

Then, the drive transmission section 50 as a joint drive mechanism of the third primary rotational axis 95 as the primary rotational axis on the most terminal side in the articulated arm of the robot 10 according to the present embodiment will be explained along the drawing. FIG. 2 is a perspective view schematically showing the structure of the drive transmission section 50 for rotating the link 80 as the second member around the third primary rotational axis 95 with respect to the joint 79 as the first member of the robot 10. It should be noted that in FIG. 2, some of the members other than the drive transmission section 50 are omitted, and at the same time, the inside of the joint 79 is shown in a partially see-through manner for the sake of convenience of explanation of the structure of the drive transmission section 50 inside the joint 79.

As described above, in the articulated arm of the robot 10 having a plurality of joint drive mechanisms having a plurality of arm members such as links and joints coupled using the secondary rotational axes and the primary rotational axes, the drive transmission section 50, which is the joint drive mechanism using the third primary rotational axis 95, namely the primary rotational axis on the most terminal side, as the rotational axis, is installed in the joint 79 (see FIG. 1). In more detail, the drive transmission section 50 is disposed on one side surface among side surfaces along a direction roughly perpendicular to the third primary rotational axis 95 of the joint 79. It should be noted that "roughly perpendicular" in the present embodiment has the meaning of including a configuration intersecting within a range of 10° (a range of 85° through 95°) in addition to a totally orthogonal configuration.

In FIG. 2 showing the details of the drive transmission section 50 including the third primary rotational axis 95, the joint 79 includes a driven pulley 86 as a driven wheel rotating using the third primary rotational axis 95 as the rotational axis, an electric motor 80M as a drive rotation source of the third primary rotational axis 95, a drive axis 97 rotating around the same rotational axis as the third primary rotational axis 95 due to the electric motor 80M, and a drive pulley 85 as a drive wheel rotating due to the electric motor 80M via the drive axis 97. Further, although a rotational position detection section 80D is disposed in the vicinity of the electric motor 80M, the position where the rotational position detection section 80D is disposed can also be a position other than the position shown in the drawing. The rotational position detection section 80D can also use a unit structure, or a module structure.

Further, the drive pulley 85 and the driven pulley 86 are coupled to each other via a timing belt 87 as an endless power transmission cable. Further, between the drive pulley 85 and the driven pulley 86, there is disposed an idler 88 having a pulley having rotatable contact with the timing belt 87 in accordance with the movement of the timing belt 87 in order to adjust the tension of the timing belt 87.

According to the drive transmission section 50 provided to the joint 79 as the first member of the configuration explained hereinabove, miniaturization of the joint 79 as the arm member to which the third primary rotational axis 95 is installed can further be achieved compared to the structure of directly connecting the electric motor as the driving rotation source to the third primary rotational axis 95. Specifically, increase in the width of the joint 79 toward the arm width direction perpendicular to the extending direction of the articulated arm caused by disposing the electric motor in the axial direction of the third primary rotational axis 95 can be suppressed.

Electric Component Mounting Section

Figure 3:
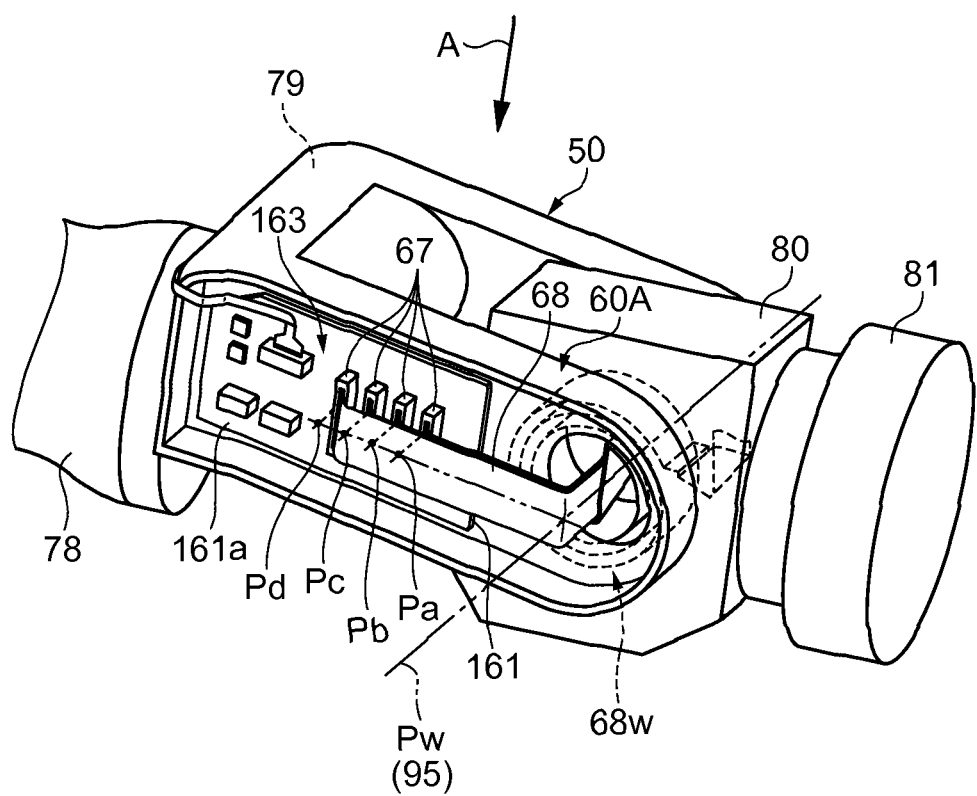
FIG. 3 is a perspective view schematically showing a general configuration of an electric component mounting section of the robot according to the first embodiment.

Then, an electric component mounting section 60A of the joint 79 including the wiring structure of the joint 79 as the first member and the link 80 as the second member will be explained. FIG. 3 is a perspective view schematically showing the general configuration of the electric component mounting section 60A of the robot 10. It should be noted that in FIG. 3, some of the members other than the electric component mounting section 60A are omitted, and at the same time, the inside of the joint 79 and the link 80 is shown in a partially see-through manner for the sake of convenience of explanation of the wiring structure inside the joint 79 and the link 80. Further, FIG. 4A is a schematic plan view showing an FPC as a flat cable used for the wiring structure in the electric component mounting section 60A, and FIG. 4B is a schematic cross-sectional view along the B-B line shown in FIG. 4A.

In FIG. 3, the electric component mounting section 60A is disposed on a side surface (the other side surface) on the opposite side to the one side surface of the joint 79 on which the drive transmission section 50 described above is disposed. The electric component mounting section 60A includes a wiring board 161, and flexible printed circuits (FPC) 68 as flat cables installed for supplying power to electric motors forming drive sources for the link 80 on the termination side of the third primary rotational axis 95 (see FIG. 1) and the end effector (not shown) attached to the link 80, or transmitting and receiving control signals between the electric motors and the robot control section via the wiring board 161.

On a first surface 161a of the wiring board 161 having circuit wiring formed on an insulating substrate, there are mounted a variety of types of electronic components 163 constituting the drive circuit or the like, and connectors 67 as connection sections to which one ends of the FPC 68 are connected. In the present embodiment, there is adopted a configuration having a plurality of FPC 68 installed in an overlapping manner, and the corresponding number of connectors 67 are mounted on the wiring board 161.

Figure 4A:
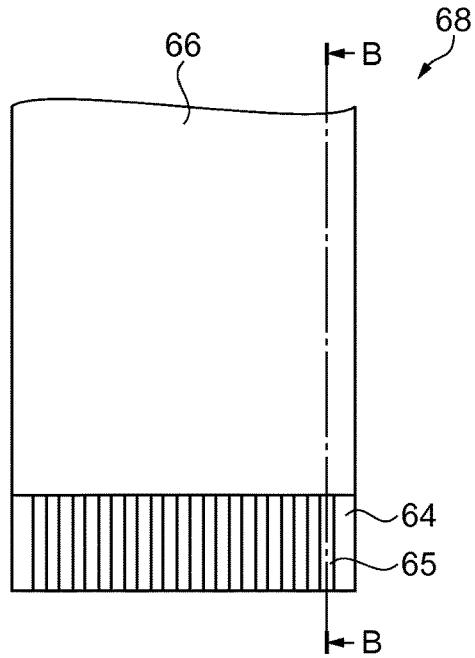
FIG. 4A is a schematic plan view showing an FPC as a flat cable in the electric component mounting section of the robot according to the first embodiment.
Figure 4B:
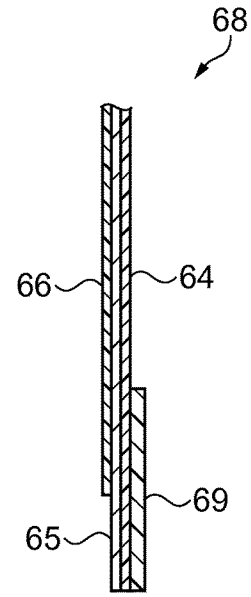
FIG. 4B is a schematic cross-sectional view along the B-B line shown in FIG. 4A.

As shown in FIGS. 4A and 4B, the FPC 68 has a metal wiring pattern 65 formed on one surface of an insulating substrate 64 having flexibility such as polyimide. An insulating film 66 made of insulating resin is stacked on a part of one surface of the substrate 64 provided with the wiring pattern 65. One end of the FPC 68 not provided with the insulating film 66 forms a connection part to the connector 67 of the wiring board 161. Similarly, a connection part not provided with the insulating film 66 is also formed on the other end (not shown) of the FPC 68. In the connection part on the one end of the FPC 68, a reinforcing plate 69 as a reinforcing member harder than the substrate 64 is disposed on the surface of the substrate 64 opposite to the surface on which the wiring pattern 65 is formed. The reinforcing plate 69 is made of a resin material having an insulating property, and can be formed using, for example, polyethylene terephthalate (PET), or can also be formed using a member thicker than the substrate 64 and made of the same material as that of the substrate 64. Similarly to this configuration, the reinforcing plate 69 is also provided to the connection part on the other end of the FPC 68 (not shown).

The FPC 68 is particularly rich in flexibility among those categorized as a flat cable, and is thin, and therefore exerts an effect on height reduction and miniaturization of the mounting structure of the electric component mounting section 60A. Further, the FPC 68 is easy to bend, and therefore has a lot of flexibility of the arrangement paths of the wiring. Further, since a reel 68w described later is easily formed, the FPC 68 is suitable for the wiring material of the members of the robot 10.

Hereinafter, the wiring paths between the joint 79 as the first member and the link 80 as the second member using the plurality of FPC 68, installation directions of the connectors 67 corresponding to the respective FPC 68, and so on will be explained in detail.

In the electric component mounting section 60A of the joint 79 as the first member shown in FIG. 3, the wiring board 161 is disposed with the first surface 161a facing to a direction roughly perpendicular to the third primary rotational axis 95 with the link 80 as the second member. The plurality of connectors 67 mounted on the first surface 161a of the wiring board 161 is mounted with connection port facing to the direction in which the FPC 68 is inserted from a direction perpendicular to the first surface 161a. The FPC 68 having one end connected to the connector 67 is disposed so that the other end, which is folded in a direction toward the third primary rotational axis 95 as the coupling section with the link 80 side by a cover (a cover 99 shown in FIG. 5) as a lid member not shown in the drawing, is extended straight, then folded again in the vicinity of the third primary rotational axis 95, and then drawn to the link 80. Then, on the other end of the FPC 68 thus pulled out to the link 80, there is formed the reel 68w wound around a rotational axis roughly parallel to the third primary rotational axis 95. Reciprocating displacement in the length direction of the FPC 68 due to the relative rotational movement between the joint 79 and the link 80 around the third primary rotational axis 95 is absorbed by the reel 68w of the FPC 68, and thus, the wiring structure not hindering the relative rotational movement can be realized.

In the present embodiment, the reel 68w is formed by winding the FPC 68 using the third primary rotational axis 95 as a winding axis Pw, and the one end of the FPC 68 drawn from the reel 68w along the winding axis Pw is connected to the connector 67 of the wiring board 161. In more detail, in the wiring structure in which the plurality of FPC 68 is disposed between the reel 68w and the connectors 67 in an overlapping manner, the connectors 67 are arranged side by side so that the longitudinal direction of the connector 67 is roughly perpendicular to the extending direction from the reel 68w to the connectors 67. In the present embodiment, in the planar view of the first surface 161a of the wiring board 161 of the electric component mounting section 60A, imaginary center lines Pa, Pb, Pc, and Pd of the respective connectors 67 roughly perpendicular to the first surface 161a and the winding axis Pw are arranged in alignment with each other.

According to the present embodiment, the connectors 67 are arranged so that the FPC 68, which are pulled out from the reel 68w and then laid around, are connected roughly perpendicularly to the first surface 161a of the wiring board 161. Thus, in the wiring structure between the joint 79 and the link 80, which rotates around the third primary rotational axis 95 with respect to the joint 79, via the FPC 68, the FPC 68 are connected in the direction roughly perpendicular to the direction in which the FPC 68 are pulled due to the rotational movement of the link 80 with respect to the joint 79 in the connection part of the connectors 67 to the FPC 68. In other words, in the case in which a tensile force acts on the one end of the FPC 68 connected to the connector 67, the direction of the tensile force acting on the reel 68w side (the other end) of the FPC 68 is set to the insertion direction of the one end of the FPC 68 in the connector 67, namely the direction perpendicular to the first surface 161a of the wiring board 161, which is different from the direction parallel to the first surface 161a. Therefore, since it becomes more difficult for the FPC 68 to be pulled out in the connection part of the connector 67 with respect to the relative rotational movement between the joint 79 and the link 80, it is possible to provide the robot 10 having a reliable wiring structure.

Moreover, in the present embodiment, in the first surface 161a of the wiring board 161, the imaginary center lines Pa, Pb, Pc, and Pd of the respective connectors 67 roughly perpendicular to the first surface 161a and the winding axis Pw (the third primary rotational axis 95) are arranged in alignment with each other.

According to this configuration, there can be obtained an advantage that the plurality of connectors 67 can be installed with a reduced space, and at the same time, the interference between the connectors 67 adjacent to each other is suppressed to provide a good workability when connecting the FPC 68 to the respective connectors 67 compared to the case in which there is adopted the configuration in which the FPC 68 is connected in parallel to the first surface 161a in the connection part of the connector 67 to the FPC 68. Therefore, it is possible to provide the robot 10, which is small in size and good in assemble operation efficiency.

Figure 5:
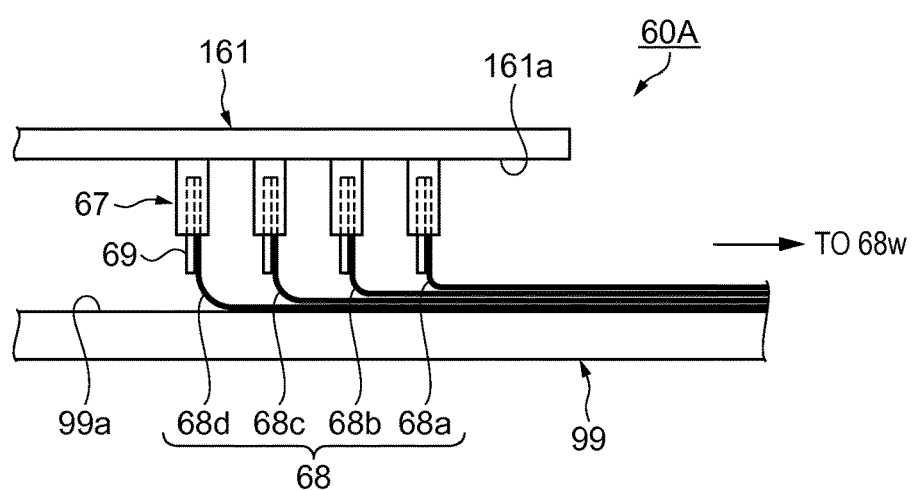
FIG. 5 is a partial schematic diagram showing apart of the electric component mounting section of the robot according to the first embodiment viewed from a direction of the arrow A show in FIG. 3.

The internal configuration of the electric component mounting section 60A such as the wiring board 161, the connectors 67, and the FPC 68 is hereinabove explained. The configuration including the cover 99, which is a lid member as an external component of the joint 79 as the first member, will hereinafter be explained along the accompanying drawings. FIG. 5 is a partial schematic diagram showing a part of the electric component mounting section of the robot 10 according to the first embodiment viewed from a direction of the arrow A show in FIG. 3.

In the electric component mounting section 60A shown in FIG. 5, the electric component mounting section 60A of the joint 79 formed of the wiring board 161, the FPC 68, and so on is provided with the cover 99 disposed with an inner wall surface 99a opposed to the first surface 161a of the wiring board 161.

The FPC 68 having the connection part on the one end side provided with the reinforcing plate 69 inserted in and fixed to the plurality of connectors 67 arranged side by side on the first surface 161a of the wiring board 161 has contact with the inner wall surface 99a of the cover 99, and is bent in the direction toward the reel 68w. In the bending portion of the FPC 68, the inner wall surface 99a of the cover 99 always applies the force of pressing the FPC 68 toward the insertion direction (connection direction) of the connectors 67. Thus, there is an effect of making it difficult for the FPC 68 to be pulled out from the connectors 67, and the connection reliability of the wiring structure using the FPC 68 is maintained.

Further, in the present embodiment, since the reinforcing plate 69 is disposed on the one end of the FPC 68 to be inserted in the connector 67, by pressing the FPC 68 with the inner wall surface 99a of the cover 99 so as to be folded at the part of the FPC 68 where the reinforcing plate 69 is installed, it is possible to keep the FPC 68 toward the direction for preventing the FPC 68 from being pulled out from the connector 67 while reducing the stress applied to the wiring pattern 65 of the FPC 68.

It should be noted that it is possible to adopt a configuration of pressing the reinforcing plate 69 of the FPC 68 with the inner wall surface 99a of the cover 99 so as to be deformed more significantly than in the configuration shown in FIG. 5, or a configuration of disposing the cover 99 so that the inner wall surface 99a has contact with the reinforcing plate 69.

Further, in FIG. 5, the FPC 68a through 68d are inserted in and fixed to the four connectors 67, respectively. These FPC 68a through 68d are limited by the inner wall surface 99a of the cover 99 to be folded toward the reel 68w (the link 80), and then stacked in this order from the wiring board 161 side.

Here, the FPC 68a located nearest to the wiring board 161 is a wiring member for signal lines, and the FPC 68d and FPC 68*c* stacked farther from the wiring board 161 are wiring members for power lines. Further, the FPC 68*b* disposed between the FPC 68*a* for the signal lines and the FPC 68*c*, 68*d* for the power lines is a shield member including a metal layer, and is connected to the ground via the connector 67. By disposing and stacking the FPC 68*c*, 68*d* for the power lines farther from the wiring board 161 than the FPC 68*a* for the signal lines, and disposing and stacking the FPC 68*b* formed of the shield member grounded between the FPC 68*c*, 68*d* for the power lines and the FPC 68*a* for the signal lines, it is possible to suppress a harmful influence such as an electrical interference exerted by heat and an electron beam generated from the power lines to other electronic circuits formed on the wiring board 161 and the FPC 68*a* for the signal lines.

It should be noted that besides the configuration of disposing the FPC 68*b* formed of the shield member between the FPC 68*c*, 68*d* for the power lines and the FPC 68*a* for the signal lines, it is also possible to adopt a configuration of disposing an insulating member having a shield effect against the heat and the electron beam. In this case, it is not required to insert the insulating member into the connector 67.

Second Embodiment

FIGS. 6A through 6E are schematic diagrams of apart of the electric component mounting section in the robot according to the second embodiment where an FPC is connected to a connector. In detail, FIG. 6A is a schematic side view showing a state before a lock lever of the connector is locked, FIG. 6B is a schematic cross-sectional view along the C-C line shown in FIG. 6A, FIG. 6C is a schematic side view showing a state in which the lock lever of the connector is locked, FIG. 6D is a schematic cross-sectional view along the C'-C' line shown in FIG. 6C, and FIG. 6E is a partial schematic diagram showing a state in which a lid member is attached in the state shown in FIG. 6C.

In the robot according to the present embodiment, the electric component mounting section 60B has a configuration different from that of the electric component mounting section 60A of the first embodiment. The constituents other than the electric component mounting section are the same between the robot according to the present embodiment and the robot 10 according to the first embodiment.

Electric Component Mounting Section

Hereinafter, a feature point (the electric component mounting section 60B) of the robot according to the present embodiment will be explained with a focus on a difference from the first embodiment with reference to FIGS. 6A through 6E. It should be noted that the same constituents as in the first embodiment are denoted with the same reference symbols, and the duplicated explanations will be omitted.

In the electric component mounting section 60B related to the present embodiment, there is provided a lock mechanism for the FPC 68 to lock the connector 67. Specifically, in the electric component mounting section 60B, the connector 67 is provided with the lock mechanism for locking the FPC 68, the connection part of which is inserted. This point is the difference point from the electric component mounting section 60A of the first embodiment. The rest of the constituents are the same between the electric component mounting section 60B of the present embodiment and the electric component mounting section 60A of the first embodiment.

When pressing a lock lever 59 into the connector 67 toward the wiring board 161 in the state in which the connection part of the FPC 68 is inserted in the connector 67 as shown in FIGS. 6A and 6B, the lock lever 59 is locked in a state in which a pressing section 59R of the lock lever 59 presses the FPC 68 from the reinforcing plate 69 side as shown in FIGS. 6C and 6D, and thus, the FPC 68 is firmly held in a state in which the FPC 68 is connected to the connector 67.

Further, as shown in FIG. 6E, there is adopted a configuration in which a projection section 99*a*1 and a recessed section 99*a*2 are provided to the inner wall surface of the cover 99A using, for example, a spot-facing process, and then the lock lever 59 of the connector 67 locking the FPC 68 in the connected state is pressed by the projection section 99*a*1 of the cover 99A.

Thus, since the lock lever 59 having locked the FPC 68 in the connected state is held by the projection section 99*a*1 of the cover 99A, it is possible to keep the connection reliability of the wiring structure of the electric component mounting section 60B with the connector 67 and the FPC 68 in a high level.

It should be noted that in FIG. 6E, there is further adopted a configuration in which the recessed section 99*a*2 of the cover 99A presses the bent portion of the FPC 68 to thereby obtain a configuration in which the FPC 68 becomes more difficult to be pulled out from the connector 67.

Besides this configuration, it is also possible to adopt a configuration in which the FPC 68 does not have contact with the recessed section 99*a*2 of the cover 99A. According to such a configuration, the connection reliability obtained by pressing the lock lever 59 with the projection section 99*a*1 of the cover 99A can be achieved while reducing the stress applied to the FPC 68.

Modified Examples of First and Second Embodiments

It should be noted that the invention is not limited to the first and second embodiments described above, but various modifications and improvements can be provided to the first and second embodiments described above.

For example, in the first and second embodiments described above, it is arranged that the other end of the FPC 68 is inserted roughly perpendicularly to the first surface 161*a* (a surface roughly perpendicular to the third primary rotational axis 95) of the wiring board 161 in the connection part of the connector 67 to the FPC 68 so that the FPC 68 is connected in the direction roughly perpendicular to the direction in which the FPC 68 is pulled due to the rotational movement of the link 80 with respect to the joint 79.

Besides the above, it is sufficient to arrange that in the case in which a tensile force acts on the one end of the FPC 68 connected to the connector 67, the direction of the tensile force acting on the reel 68*w* side (the other end) of the FPC 68 is set to the insertion direction of the one end of the FPC 68 in the connector 67, namely the direction different from the direction parallel to the first surface 161*a* of the wiring board 161.

Further, although in the above description of the first and second embodiments, there is explained the configuration using the FPC 68 as the flat cables as the wiring member, the invention is not limited to this configuration. For example, it is also possible to adopt a configuration using a so-called flat cable thicker and harder than the FPC 68, or other flat cables called harness.

Further, it is also possible to adopt a configuration providing the inner wall surface 99*a*, 99*a*1, 99*a*2 of the cover 99, 99A with a cushion formed of an elastic member. Thus, it is possible to provide a structure of holding the FPC 68 with the cover 99, 99A while reducing the stress applied to the FPC 68.

Further, although in the above description of the second embodiment, there is explained the example of using the cover 99A provided with concavity and convexity formed of the recessed section 99*a*2 and the projection section 99*a*1 using the spot-facing process with reference to FIG. 6E, the invention is not limited to this example, but it is also possible to adopt a cover provided with concavity and convexity by attaching a member forming the projection section to a cover member having a plate-like shape.

Third Embodiment

In a robot according to a third embodiment, an electric component mounting section 60C has a configuration different from that of the electric component mounting section 60A of the first embodiment. The rest of the constituents are the same between the robot according to the present embodiment and the robot 10 according to the first embodiment.

Hereinafter, a feature point (the electric component mounting section 60C) of the robot according to the present embodiment will be explained with a focus on a difference from the first embodiment. It should be noted that the same constituents as in the first embodiment are denoted with the same reference symbols, and the duplicated explanations will be omitted.

Electric Component Mounting Section

First of all, the electric component mounting section 60C of the joint 79 including the wiring structure of the joint 79 as the first member and the link 80 as the second member, and a wiring relay section provided to the link 80 will be explained.

Figure 7:
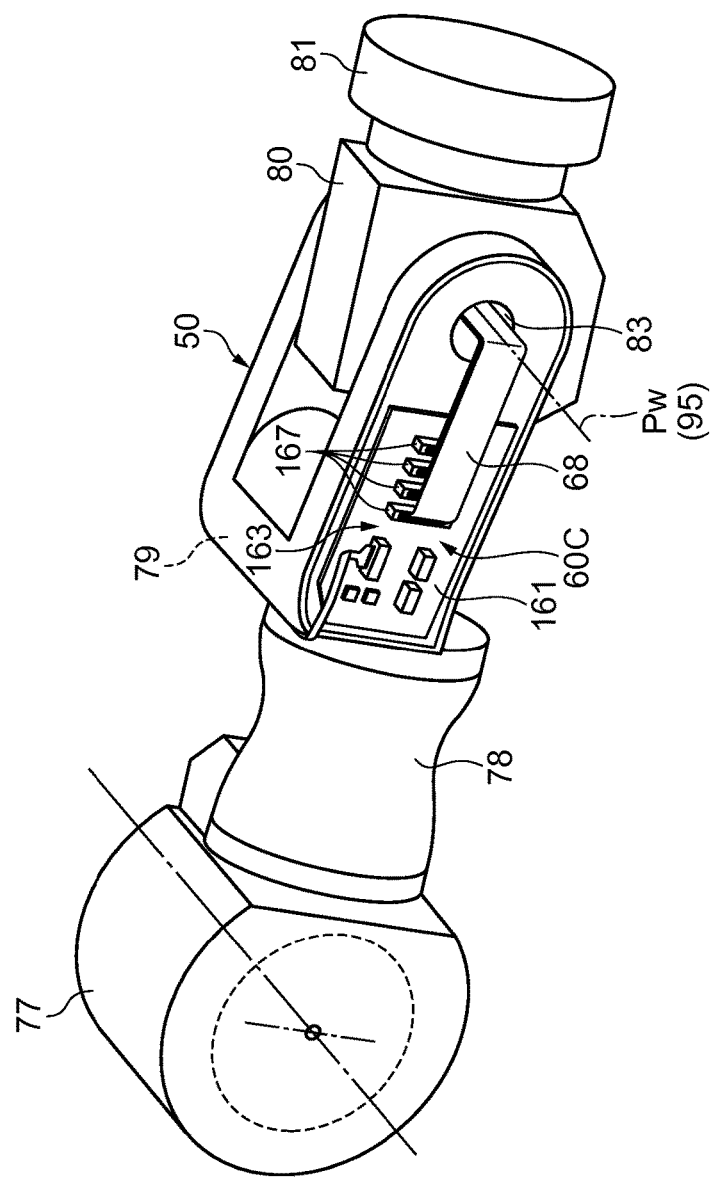
FIG. 7 is a perspective view schematically showing a general configuration of an electric component mounting section of a robot according to a third embodiment of the invention.
Figures 8A, 8B:
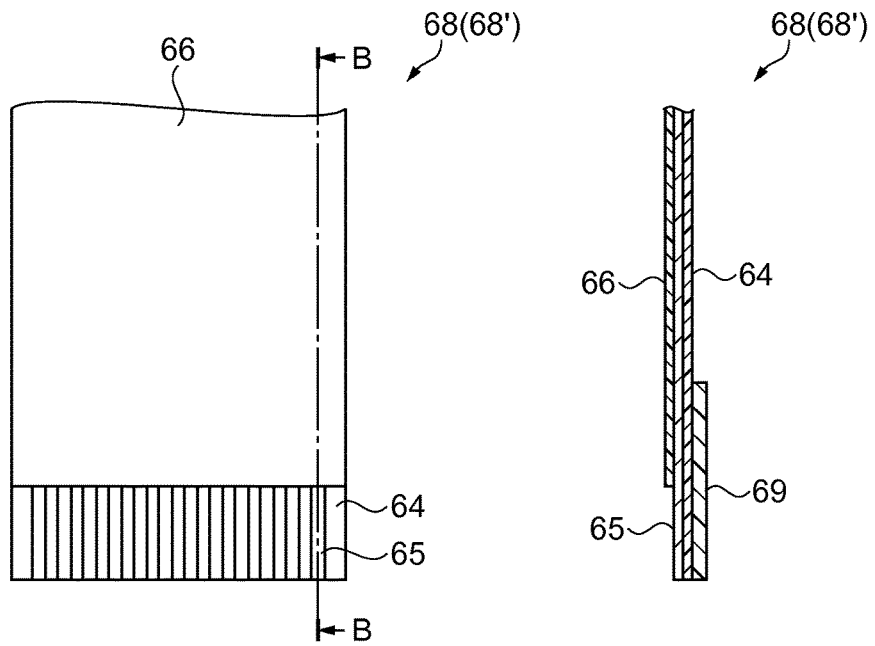
FIG. 8A is a schematic plan view showing an FPC as a flat cable in the electric component mounting section of the robot according to the third embodiment.
FIG. 8B is a schematic cross-sectional view along the B-B line shown in FIG. 8A.
Figure 9:
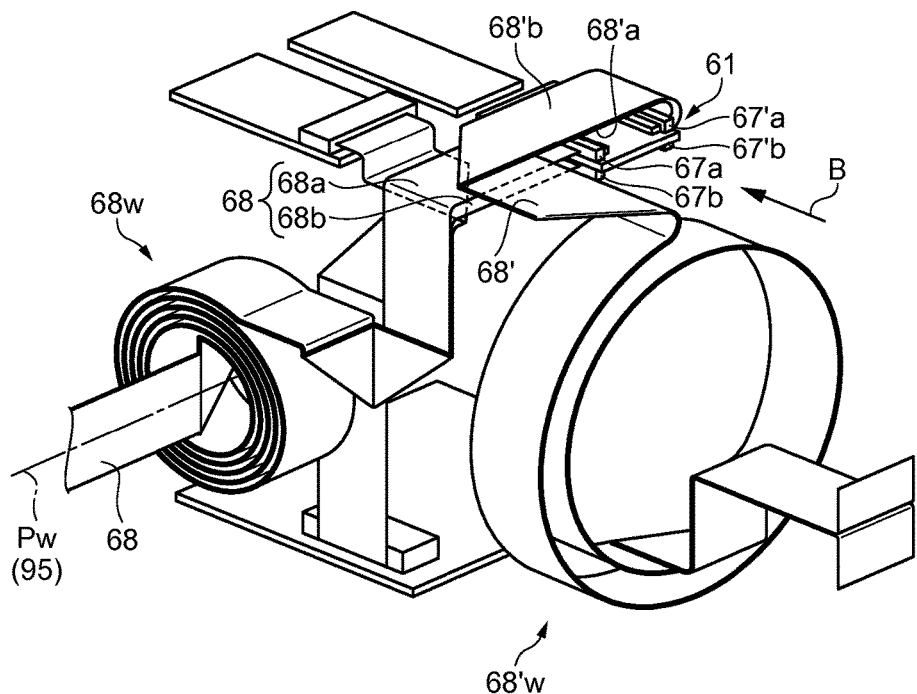
FIG. 9 is a partial perspective view schematically showing a wiring relay section of the robot according to the third embodiment.

FIG. 7 is a perspective view schematically showing a general configuration of the electric component mounting section 60C. It should be noted that in FIG. 7, some of the members other than the electric component mounting section 60C are omitted, and at the same time, the inside of the joint 79 and the link 80 is shown in a partially see-through manner for the sake of convenience of explanation of the wiring structure inside the joint 79 and the link 80. Further, FIG. 8A is a schematic plan view showing an FPC as a flat cable used for the wiring structure in the electric component mounting section 60C, and FIG. 8B is a schematic cross-sectional view along the B-B line shown in FIG. 8A. Further, FIG. 9 is a partial perspective view schematically showing the wiring relay section for relaying the wiring arranged from the electric component mounting section 60C of the joint 79 to the link 80.

In FIG. 7, the electric component mounting section 60C is disposed on a side surface (the other side surface) on the opposite side to the one side surface of the joint 79 on which the drive transmission section 50 described above is disposed. The electric component mounting section 60C includes the wiring board 161, and the flexible printed circuits (FPC) 68 as the flat cables installed for supplying power to the electric motors forming the drive sources for the link 80 on the termination side of the third primary rotational axis 95 (see FIG. 1) and the end effector (not shown) as the operating section attached to the link 80, or transmitting and receiving the control signals between the electric motors and the robot control section via the wiring board 161.

On the wiring board 161 having the circuit wiring formed on the insulating substrate, there are mounted a variety of types of electronic components 163 constituting the drive circuit and so on, and the connectors 167 as connection sections to which one ends of the FPC 68 are connected. In the present embodiment, there is adopted a configuration having a plurality of FPC 68 installed in an overlapping manner, and the corresponding number of connectors 167 are mounted on the wiring board 161.

One end of each of the FPC 68 is inserted in and fixed to the corresponding one of the plurality of connectors 167 mounted on the wiring board 161, and the other end side are arranged from the wiring path 83 on the termination side of the joint 79 to the link 80. In the present embodiment, the wiring path 83 extends along the winding axis Pw of the reel 68*w* formed by winding the FPC 68 described later, and the winding axis Pw coincides with the third primary rotational axis 95.

The FPC 68 arranged inside the link 80 reaches the wiring relay section inside the link 80 shown in FIG. 9 (the details will be described later).

As shown in FIGS. 8A and 8B, the FPC 68 has a metal wiring pattern 65 formed on one surface of an insulating substrate 64 having flexibility such as polyimide. An insulating film 66 made of insulating resin is stacked on a part of one surface of the substrate 64 provided with the wiring pattern 65. One end of the FPC 68 not provided with the insulating film 66 forms a connection part to the connector 167 of the wiring board 161. Similarly, a connection part not provided with the insulating film 66 is also formed on the other end side (not shown) of the FPC 68. In the connection part on the one end of the FPC 68, a reinforcing plate 69 as a reinforcing member harder than the substrate 64 is disposed on the surface of the substrate 64 opposite to the surface on which the wiring pattern 65 is formed. The reinforcing plate 69 is made of a resin material having an insulating property, and can be formed using, for example, polyethylene terephthalate (PET), or can also be formed using a member thicker than the substrate 64 and made of the same material as that of the substrate 64. Similarly to this configuration, the reinforcing plate 69 is also provided to the connection part on the other end of the FPC 68 (not shown).

The FPC 68 is particularly rich in flexibility among those categorized as a flat cable, and is thin, and therefore exerts an effect on height reduction and miniaturization of the mounting structure of the electric component mounting section 60C. Further, the FPC 68 is easy to bend, and therefore has a lot of flexibility of the arrangement paths of the wiring. Further, since the reel 68*w* described later is easily formed, the FPC 68 is suitable for the wiring material of the members of the robot 10.

It should be noted that in FIGS. 8A and 8B, the symbol 68' is attached to the FPC together with the symbol 68, which denotes that the FPC 68' used for the wiring relay section in the link 80 shown in FIG. 9 described later has the same configuration as shown in FIGS. 8A and 8B.

Hereinafter, there will be explained the wiring relay section for relaying the wiring with the FPC 68 (68') using a relay board 61 provided to the link 80 in the wiring structure of arranging the wiring from the joint 79 as the first member to the end effector via the link 80 as the second member and then connecting the wiring. In particular, arrangement paths of the plurality of FPC 68 (68') in the wiring relay section, and the installation positions and the orientation of the connectors as the connection sections corresponding respectively to the FPC 68 (68') will be explained in detail along FIG. 9.

In FIG. 9, on the other end side of the FPC 68 drawn from the wiring path 83 (see FIG. 7) of the joint 79 as the first member to the link 80 as the second member along the third primary rotational axis 95, there is formed the reel 68w wound around the rotational axis roughly parallel to the third primary rotational axis 95. Reciprocating displacement in the length direction of the FPC 68 due to the relative rotational movement between the joint 79 and the link 80 around the third primary rotational axis 95 is absorbed by the reel 68w of the FPC 68, and thus, the wiring structure not hindering the relative rotational movement can be realized.

A part of the FPC 68 nearer to the other end than the reel 68w is once drawn toward the end effector, then arbitrarily bent, and then connected to the connection section of the relay board 61. In the present embodiment, as the FPC 68, a plurality of FPC including two FPC 68, namely a first FPC 68a as a first flat cable and a second FPC 68b as a second flat cable, is arranged in an overlapping manner, and among these FPC, the first FPC 68a and the second FPC 68b are respectively connected to a first connector 67a as a first connection section of the relay board 61 and a second connector 67b as a second connection section. The first connector 67a and the second connector 67b are disposed on both surfaces on one end side of the relay board 61 one by one (the details will be described later).

On both surfaces on the other end side of the relay board 61, there are disposed a third connector 67'a connected to the first connector 67a, and a fourth connector 67'b connected to the second connector 67b, respectively.

One end of the third FPC 68'a as a third flat cable is connected to the third connector 67'a, and the fourth FPC 68'b as a fourth flat cable is connected to the fourth connector 67'b.

It should be noted that in the present embodiment, it is assumed that the first FPC 68a and the third FPC 68'a connected to the first FPC 68a are wiring for the power lines, and the second FPC 68b and the fourth FPC 68'b connected to the second FPC 68b are wiring for the signal lines.

The third FPC 68'a and the fourth FPC 68'b having one ends connected respectively to the third connector 67'a and the fourth connector 67'b are drawn in the directions toward the other ends of the first FPC 68a and the second FPC 68b, respectively, and are made to overlap each other.

The other end side of the FPC 68' having the third FPC 68'a and the fourth FPC 68'b overlapping each other is arbitrarily bent and then drawn in the direction toward the link 81 (the termination side), and in the link 81, there is formed a reel 68'w obtained by winding the FPC 68' around the secondary rotational axis 96 of the link 81 with respect to the link 80. Reciprocating displacement in the length direction of the FPC 68' due to the relative rotational movement between the link 80 and the link 81 around the secondary rotational axis 96 is absorbed by the reel 68'w of the FPC 68', and thus, the wiring structure not hindering the relative rotational movement can be realized.

A part of the FPC 68' nearer to the other end than the reel 68'w is drawn toward the termination of the articulated arm, and the other end of the FPC 68' is connected to the end effector not shown.

The first connector 67a, the second connector 67b, the third connector 67'a, and the fourth connector 67'b disposed on the relay board 61 are disposed on the termination side, namely on the end effector (not shown) side, of the third primary rotational axis 95 in the articulated arm. According to this configuration, in the wiring structure of achieving the connection between the joint 79 and the end effector by relaying the FPC 68, 68' using the relay board 61, the arrangement advantageous to the reduction of the space for the relay board 61 and the first connector 67a, the second connector 67b, the third connector 67'a, and the fourth connector 67'b disposed on the relay board 61 is made clear.

Figure 10:
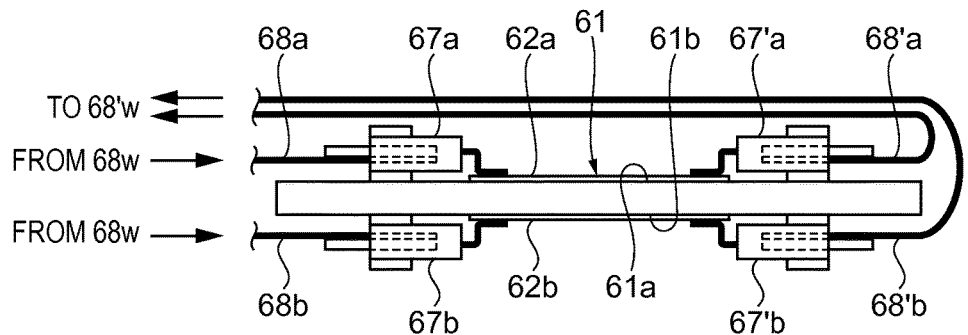
FIG. 10 is a diagram showing details of the wiring relay section of the third embodiment in an enlarged manner, and is a partial side view viewed from a direction of the arrow B shown in FIG. 9.

Here, a detailed configuration of the wiring relay section of the electric component mounting section 60C will be explained with reference to the drawings. FIG. 10 is a diagram showing details of the wiring relay section of the present embodiment in an enlarged manner, and is a partial side view viewed from a direction of the arrow B shown in FIG. 9.

In the wiring relay section of the electric component mounting section 60C shown in FIG. 10, the first connector 67a is disposed on the one end side of the first surface 61a, which is an upper surface in the drawing among the both surfaces of the relay board 61, and the third connector 67'a connected to the first connector 67a using a first connection line 62a is disposed on the other end side of the first surface 61a.

Further, the second connector 67b is disposed on the one end side of a second surface 61b, which is a lower surface of the relay board 61 in the drawing, and the fourth connector 67'b connected to the second connector 67b using a second connection line 62b is disposed on the other end side of the second surface 61b.

On the one end side of the relay board 61, the first connector 67a and the second connector 67b are disposed so that the respective connection ports face to the outside in the horizontal direction (the direction roughly parallel to the first surface 61a and the second surface 61b), and the first FPC 68a and the second FPC 68b corresponding respectively to the first connector 67a and the second connector 67b are connected roughly in parallel to the first surface 61a or the second surface 61b.

Further, on the other end side of the relay board 61, the third connector 67'a and the fourth connector 67'b are disposed so that the respective connection ports face to the outside in the horizontal direction, and the third FPC 68'a and the fourth FPC 68'b corresponding respectively to the third connector 67'a and the fourth connector 67'b are connected roughly in parallel to the first surface 61a or the second surface 61b.

Among the first FPC 68a and the second FPC 68b arranged from the reel 68w, the first FPC 68a is connected to the first connector 67a roughly in parallel to the first surface 61a, and the second FPC 68b is connected to the second connector 67b roughly in parallel to the second surface 61b.

The third FPC 68'a connected to the third connector 67'a roughly in parallel to the first surface 61a and the fourth FPC 68'b connected to the fourth connector 67'b roughly in parallel to the second surface 61b are folded back toward the first surface 61a to overlap each other above the first surface 61a, then drawn in parallel to the first surface 61a, then arbitrarily folded in the other end side, and then form the reel 68'w on the link 81 side (see also FIG. 9).

According to the present embodiment, in the wiring structure of achieving the connection from the joint 79 as the first member to the termination side of the articulated arm including the end effector while relaying the FPC 68, 68' using the relay board 61, a configuration of the arrangement and the directions of the relay board 61 capable of relaying the wiring of the FPC 68, 68' with reduced space, and the first connector 67a, the second connector 67b, the third connector 67'a, and the fourth connector 67'b disposed on the relay board 61 is made clear.

In particular, according to the configuration of the wiring relay section of the present embodiment, the fourth FPC 68'b connected to the fourth connector 67'b and folded back toward the first surface 61a is installed with the bending angle suppressed to a smaller value than in the third FPC 68'a connected to the third connector 67'a and folded back toward the first surface 61a. Since the wiring pattern provided to the fourth FPC 68'b as the flat cable for the signal lines is thinner compared to the third FPC 68'a as the flat cable for the power lines provided with a relatively thick wiring pattern, according to the present embodiment in which the fourth FPC 68'b is installed with a larger bending radius, it is possible to provide a wiring structure in which a crack and a break of the wiring pattern of the fourth FPC for the signal lines are inhibited from occurring.

Further, according to the wiring structure having the wiring relay section of the present embodiment, it is possible to provide a wiring structure advantageous to the miniaturization of the joint structure between the link (the second member) 80 as the wrist section to be a dominant factor in particular for the miniaturization and the joint 79 as the first member coupled to the link 80 on the base member side using the third primary rotational axis 95 as the rotational axis in the robot 10 having the articulated arm. Therefore, the small-sized highly-functional multiaxial robot 10 can be provided.

Fourth Embodiment

Figure 11A:
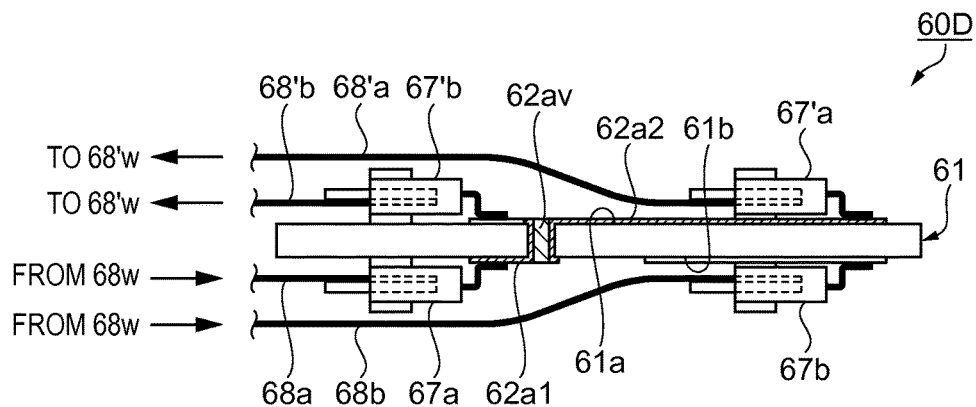
Figure 11B:
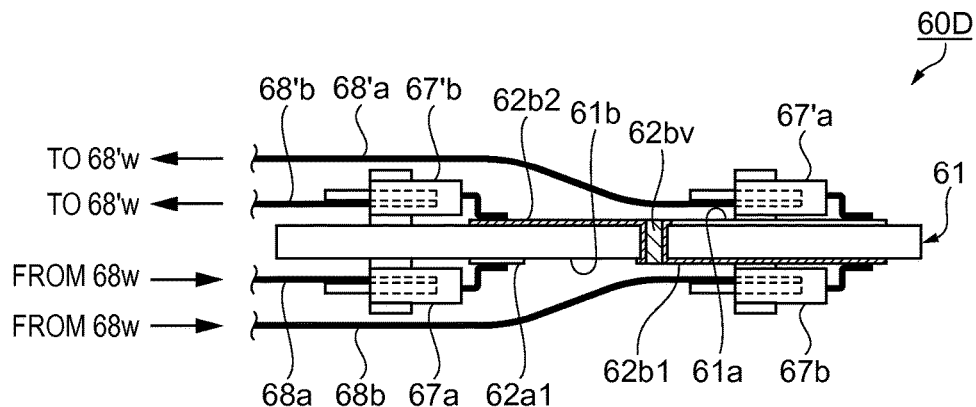

FIGS. 11A and 11B are diagrams showing details of a wiring relay section of a fourth embodiment in an enlarged manner, wherein FIG. 11A is partial cross-sectional view schematically showing a cross-section of the wiring relay section (a relay board) in a part where the cross-section of a second connection line can be viewed, and FIG. 11B is a partial cross-sectional view schematically showing a cross-section of the wiring relay section (the relay board) of a part where the cross-section of a first connection line can be viewed.

In the robot according to the present embodiment, the wiring relay section of an electric component mounting section 60D has a configuration different from that of the wiring relay section of the electric component mounting section 60C of the third embodiment. The rest of the constituents are the same between the robot according to the present embodiment and the robot according to the third embodiment.

Hereinafter, a feature point (the wiring relay section of the electric component mounting section 60D) of the robot according to the present embodiment will be explained with a focus on a difference from the third embodiment with reference to FIGS. 11A and 11B. It should be noted that the same constituents as in the third embodiment are denoted with the same reference symbols, and the duplicated explanations will be omitted.

Electric Component Mounting Section

As shown in FIG. 11A, in the wiring relay section of the electric component mounting section 60D of the present embodiment, the first connector 67a and the second connector 67b are disposed on either of the first surface 61a and the second surface 61b of the relay board 61. In the present embodiment, the first connector 67a is disposed on one end side of the second surface 61b so that the connection port faces to the outside in the horizontal direction, and the second connector 67b is disposed on the other end side of the second surface 61b so that the connection port faces in the same direction as the connection port of the first connector 67a.

The third connector 67'a and the fourth connector 67'b are disposed on the first surface 61a opposite to the second surface 61b on which the first connector 67a and the second connector 67b are disposed.

The third connector 67'a is disposed on the other end side (on the opposite side to the first connector 67a in a planar view) of the first surface 61a so that the connection port faces in the same direction as those of the first connector 67a and the second connector 67b, and at the same time, connected to the first connector 67a with the first connection lines 62a1, 62a2 via a through hole 62av for achieving the connection between the first surface 61a and the second surface 61b.

Further, as shown in FIG. 11B, the fourth connector 67'b is disposed on the one end side (on the opposite side to the second connector 67b in a planar view) of the first surface 61a so that the connection port faces in the same direction as that of the third connector 67'a, and at the same time, connected to the second connector 67b with the second connection lines 62b1, 62b2 via a through hole 62bv for achieving the connection between the first surface 61a and the second surface 61b.

The first FPC 68a and the second FPC 68b arranged from the reel 68w are respectively connected to the first connector 67a and the second connector 67b disposed on the second surface 61b roughly in parallel to the first surface 61a.

Further, the third FPC 68'a connected to the third connector 67'a roughly in parallel to the first surface 61a and the fourth FPC 68'b connected to the fourth connector 67'b roughly in parallel to the first surface 61a are directly drawn in parallel to the first surface 61a, then arbitrarily folded in the other end side, and then form the reel 68'w on the link 81 side (see also FIG. 9).

According to the configuration example of the wiring relay section of the fourth embodiment, by using the first connection lines 62a1, 62a2 via the through hole 62av, and the second connection lines 62b1, 62b2 via the through hole 62bv, the flexibility of arrangement of the first connector 67a, the second connector 67b, the third connector 67'a, and the fourth connector 67'b on the first surface 61a and the second surface 61b of the relay board 61 increases.

Thus, the third FPC 68'a connected to the third connector 67'a, and the fourth FPC 68'b connected to the fourth connector 67'b can be drawn to the end effector side (the reel 68'w side) and arranged with little bend, and therefore, a small-sized more reliable wiring structure of the robot can be provided.

It should be noted that the invention is not limited to the third and fourth embodiments described above, but various modifications and improvements can be provided to the third and fourth embodiments described above. Some modified examples will be described below.

Modified Examples of Third and Fourth Embodiments

Figure 12:
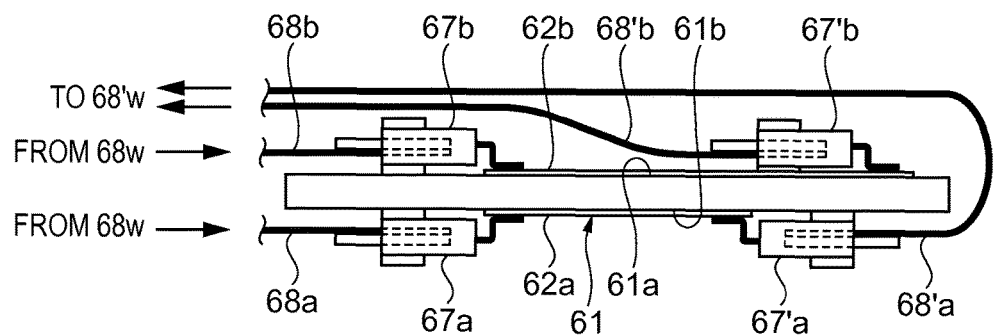
FIG. 12 is a diagram showing a modified example of the wiring relay section of the third embodiment and the fourth embodiment, and is a partial side view viewed from the direction of the arrow B shown in FIG. 9.

FIG. 12 is a diagram showing a modified example of the wiring relay section of the third embodiment and the fourth embodiment, and is a partial side view viewed from the direction of the arrow B shown in FIG. 9. It should be noted that the same constituents as in the third embodiment and the fourth embodiment are denoted with the same reference symbols, and the duplicated explanations will be omitted.

In the modified example of the wiring relay section of the robot shown in FIG. 12, the second connector 67b is disposed on the one end side of the first surface 61a of the relay board 61 so that the connection port faces to the outside in the horizontal direction, and the fourth connector 67'b is disposed on the other end side of the first surface 61a so that the connection port faces in the same direction as the connection port of the second connector 67b. The second connector 67b and the fourth connector 67'b are connected to each other with the second connection line 62b formed on the first surface 61a.

Further, the first connector 67a is disposed on the one end side of the second surface 61b of the relay board 61 so that the connection port faces to the outside in the horizontal direction, which is the same as the connection port of the second connector 67b, and the third connector 67'a is disposed on the other end side of the second surface 61b so that the connection port faces to the outside in the horizontal direction, which is an opposite direction to the direction of the connection port of the first connector 67a. The first connector 67a and the third connector 67'a are connected to each other with the second connection line 62a formed on the second surface 61b.

The first FPC 68a arranged from the reel 68w is connected to the first connector 67a roughly in parallel to the second surface 61b, and the second FPC 68b is connected to the second connector 67b roughly in parallel to the first surface 61a.

The fourth FPC 68'b connected to the fourth connector 67'b roughly in parallel to the first surface 61a is directly drawn passing through the above of the first surface 61a and an upper surface of the second connector 67b, and the third FPC 68'a connected to the third connector 67'a roughly in parallel to the second surface 61b is folded back toward the first surface 61a to overlap the fourth FPC 68'b above the first surface 61a, and further arbitrarily folded in the other end side, and then form the reel 68'w on the link 81 side (see also FIG. 9).

According to the wiring structure of the robot using the wiring relay section of the present modified example, it is possible not only to suppress the bending angle of the third FPC 68'a for the power lines, which is connected to the third connector 67'a, and folded back toward the first surface 61a, to an amount smaller than in the third embodiment described above, but also to install the fourth FPC 68'b connected to the fourth connector 67'b toward the end effector (the reel 68'w) with little bend.

The invention is not limited to the third and fourth embodiments described above and the modified examples thereof, but various modifications can be provided within the scope or the spirit of the invention.

For example, although in the above description of the third and fourth embodiments, there is explained the configuration of using the FPC 68 as the flat cables as the wiring member, the invention is not limited to this configuration. For example, it is also possible to adopt a configuration using a so-called flat cable thicker and harder than the FPC 68, or other flat cables called harness.

Further, in the fourth embodiment described above, the first connector 67a and the second connector 67b are disposed on the second surface 61b of the relay board 61, and the third connector 67'a and the fourth connector 67'b are disposed on the first surface 61a.

In an opposite manner, it is also possible to adopt a configuration of disposing the first connector 67a and the second connector 67b on the first surface 61a of the relay board 61, and disposing the third connector 67'a and the fourth connector 67'b on the second surface 61b.

Fifth Embodiment

In a robot according to a fifth embodiment, an electric component mounting section 60E has a configuration different from that of the electric component mounting section 60A of the first embodiment. The rest of the constituents are the same between the robot according to the present embodiment and the robot 10 according to the first embodiment.

Hereinafter, a feature point (the electric component mounting section 60E) of the robot according to the present embodiment will be explained with a focus on a difference from the first embodiment. It should be noted that the same constituents as in the first embodiment are denoted with the same reference symbols, and the duplicated explanations will be omitted.

Electric Component Mounting Section

First of all, the wiring structure between the joint 79 as the first member and the link 80 as the second member rotatably coupled to the joint 79 will be explained along the drawings with a focus on the electric component mounting section 60E of the joint 79.

Figure 13:
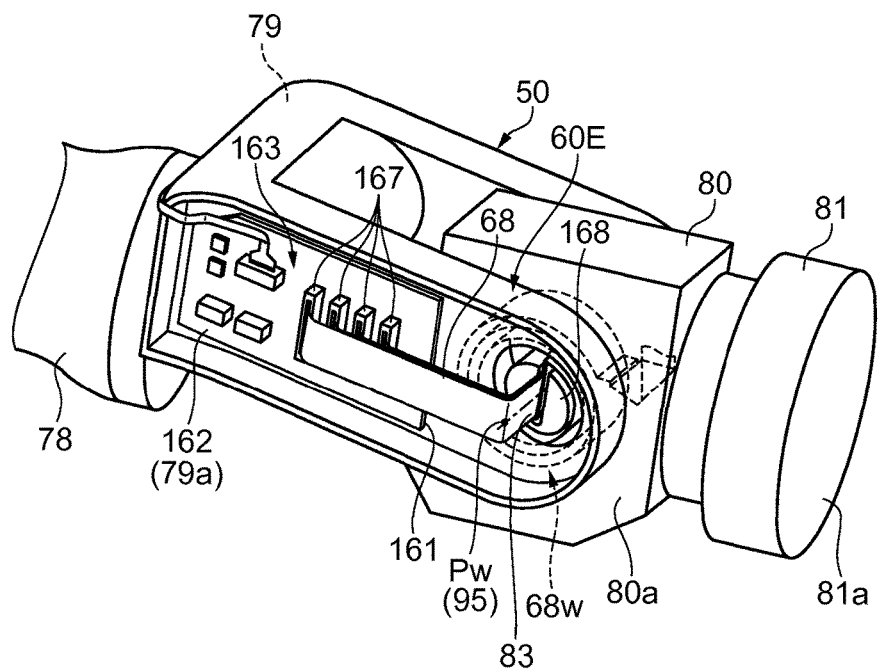
FIG. 13 is a perspective view schematically showing a general configuration of an electric component mounting section of a robot according to a fifth embodiment of the invention.
Figures 14A, 14B:
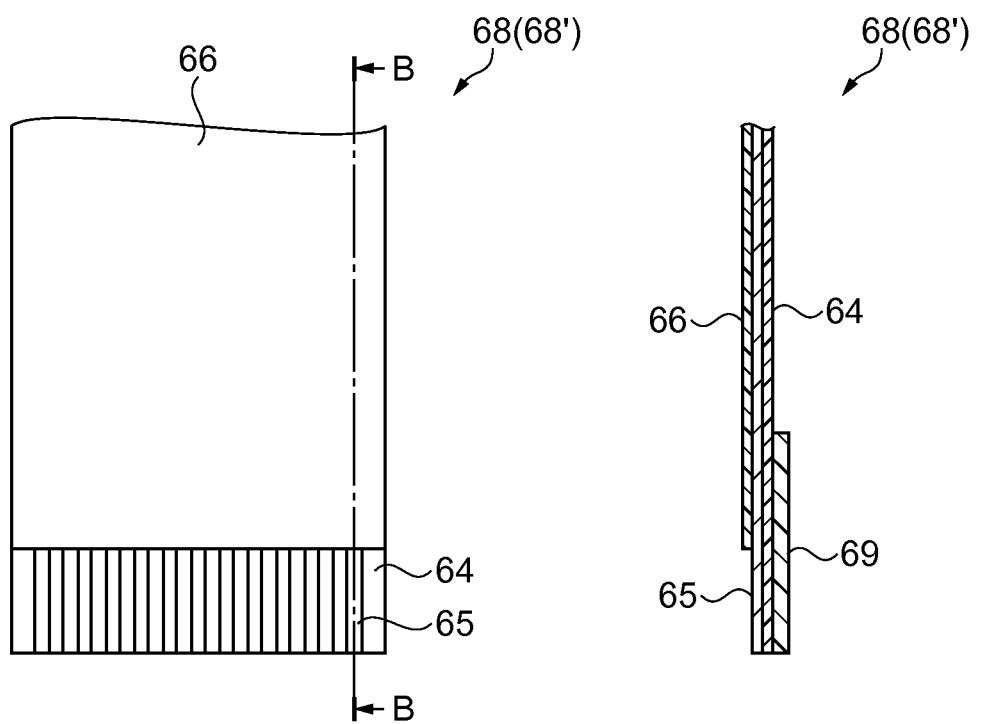
FIG. 14A is a schematic plan view showing an FPC as a flat cable in the electric component mounting section of the robot according to the fifth embodiment.
FIG. 14B is a schematic cross-sectional view along the B-B line shown in FIG. 14A.
Figure 15A:
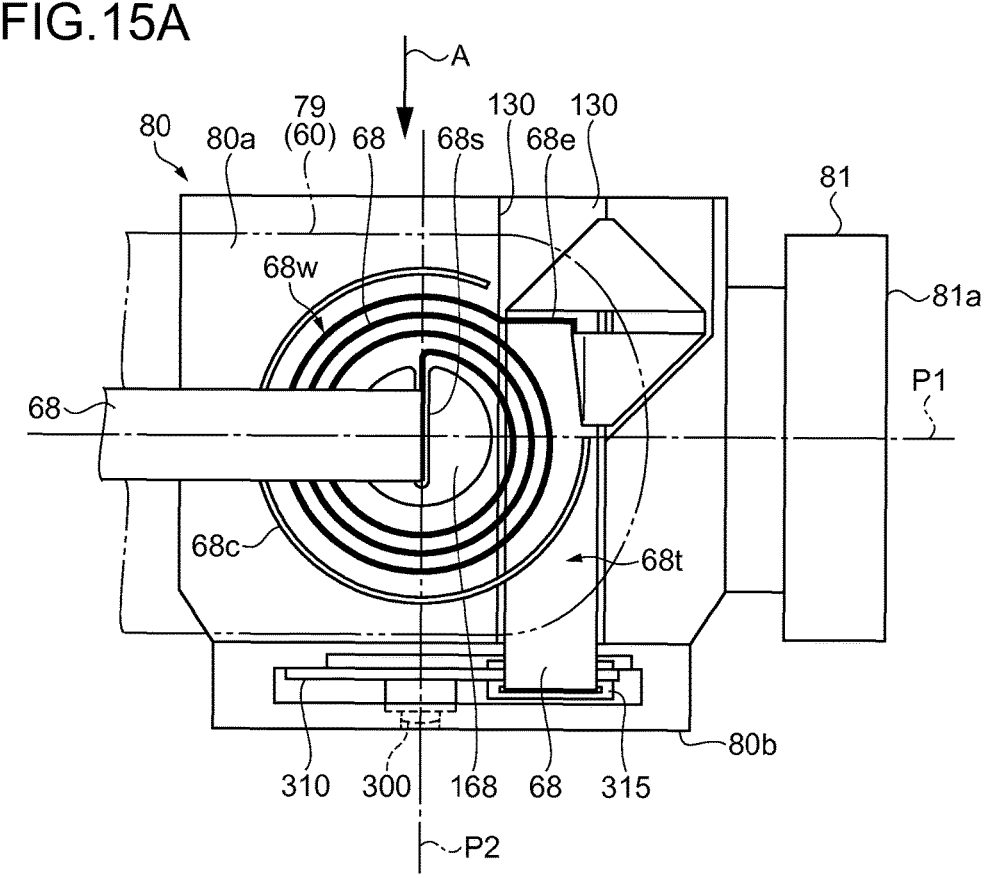
Figure 15B:
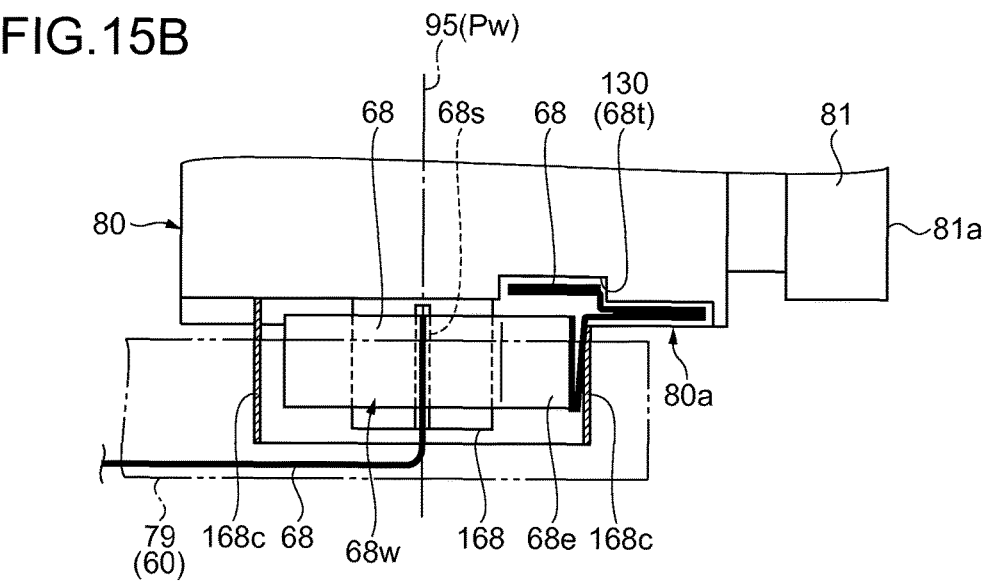

FIG. 13 is a perspective view schematically showing a general configuration of the electric component mounting section 60E. It should be noted that in FIG. 13, some of the members other than the electric component mounting section 60E are omitted, and at the same time, the inside of the joint 79 and the link 80 is shown in a partially see-through manner for the sake of convenience of explanation of the wiring structure inside the joint 79 and the link 80. Further, FIG. 14A is a schematic plan view showing an FPC as a flat cable used for the wiring structure in the electric component mounting section 60E, and FIG. 14B is a schematic cross-sectional view along the B-B line shown in FIG. 14A. Further, FIGS. 15A and 15B are diagrams schematically showing a reel 68w of the robot 10 according to the present embodiment and a wiring path 68t from the reel 68w to a camera 300 as a sub-operating member, wherein FIG. 15A is a partial enlarged side view viewing a second surface 80a side, and FIG. 15B is a partial enlarged plan view viewed from a direction of the arrow A shown in FIG. 15A. It should be noted that in FIGS. 15A and 15B, for the sake of convenience of easy-to-understand explanation of the configuration of the wiring path 68t from the reel 68w of the link 80 to the camera 300, the position of the electric component mounting section 60E of the joint 79 is partially indicated by a dotted line, and at the same time, in FIG. 15B, a cover member 168c is partially cut out in the drawing.

In FIG. 13, the electric component mounting section 60E is disposed on a side surface (the other side surface) on the opposite side to the one side surface of the joint 79 on which the drive transmission section 50 described above is disposed. Specifically, the electric component mounting section 60E is disposed on a first surface 79a on an opposite side to the side surface on which the drive transmission section 50 is disposed among the side surfaces roughly perpendicular to the third primary rotational axis 95, around which the link 80 as the second member rotates with respect to the joint 79 as the first member in a bending or stretching manner.

The electric component mounting section 60E includes the wiring board 161, and the flexible printed circuits (FPC) 68 as the flat cables installed for supplying power to the electric motors forming the drive sources for the link 80 on the termination side of the third primary rotational axis 95, the link 81, and the end effector (not shown) as an operating member attached to an operating member attachment surface 81a of the link 81, or transmitting and receiving the control signals between the electric motors and the robot control section via the wiring board 161.

On the wiring board 161 having the circuit wiring formed on a circuit forming surface 162 of the insulating substrate, there are mounted a variety of types of electronic components 163 constituting the drive circuit and so on, and the connectors 167 as the connection sections to which the FPC 68 are connected. In the present embodiment, there is adopted a configuration having the plurality of FPC 68 installed in an overlapping manner, and the corresponding number of connectors 167 are mounted on the wiring board 161. The wiring board 161 is disposed so that the circuit forming surface 162 thereof is roughly parallel to the first surface 79a of the joint 79.

One ends of the FPC 68 are inserted in and fixed to the respective connectors 167 mounted of the wiring board 161, and the other end side of the FPC 68 is disposed extending toward the termination side of the joint 79 keeping the principal surfaces of the FPC 68 parallel to the first surface 79a (the circuit forming surface 162), and then folded toward a direction roughly parallel to the third primary rotational axis 95, and then arranged from the wiring path 83 extending toward the link 80 to the link 80. Here, a surface of the link 80 roughly parallel to the first surface 79a of the joint 79 is defined as a second surface 80a.

The other end side of the FPC 68 arranged inside the link 80 is once fixed to a core member 168 provided to the link 80, and a part of the FPC 68 nearer to the other end than a part of the FPC 68 fixed to the core member 168 is wound in a predetermined winding direction around the winding axis Pw roughly parallel to the third primary rotational axis 95, and thus, there is formed the reel 68w including the core member 168 and the FPC partially fixed to, and wound around the core member 168. The reel 68w and the wiring paths nearer to the termination than the reel 68w will be explained later in detail along FIGS. 15A and 15B.

As shown in FIGS. 14A and 14B, the FPC 68 has a metal wiring pattern 65 formed on a principal surface of an insulating substrate 64 having flexibility such as polyimide. An insulating film 66 made of insulating resin is stacked on a part of the substrate 64 provided with the wiring pattern 65. One end of the FPC 68 not provided with the insulating film 66 forms a connection part to the connector 167 of the wiring board 161. Similarly, a connection part not provided with the insulating film 66 is also formed on the other end side (not shown) of the FPC 68. In the connection part on the one end of the FPC 68, the reinforcing plate 69 as the reinforcing member harder than the substrate 64 is disposed on the surface of the substrate 64 opposite to the surface on which the wiring pattern 65 is formed. The reinforcing plate 69 is made of a resin material having an insulating property, and can be formed using, for example, polyethylene terephthalate (PET), or can also be formed using a member thicker than the substrate 64 and made of the same material as that of the substrate 64. Similarly to this configuration, the reinforcing plate 69 is also provided to the connection part on the other end of the FPC 68 (not shown).

The FPC 68 is particularly rich in flexibility among those categorized as a flat cable, and is thin, and therefore exerts an effect on height reduction and miniaturization of the mounting structure of the electric component mounting section 60E. Further, the FPC 68 is easy to bend, and therefore has a lot of flexibility of the arrangement paths of the wiring. Further, since the reel 68w described later is easily formed, the FPC 68 is suitable for the wiring material of the members of the robot 10.

Then, the reel 68w and the wiring paths nearer to the termination than the reel 68w will be explained in detail along the drawings.

In FIGS. 15A and 15B, the other end side of the FPC 68 drawn from the wiring path 83 (see FIG. 13) of the joint 79 as the first member toward the link 80 is once fixed to a first fixation section 68s of the core member 168 having a cylindrical shape and disposed roughly perpendicularly (along the third primary rotational axis 95) to the second surface 80a of the link 80. The winding axis (a center axis) Pw of the core member 168 (the first fixation section 68s) is a starting point of winding of the reel 68w of the FPC 68. Although in the description of the present embodiment, there is explained a configuration in which the winding axis Pw coincides with the third primary rotational axis 95 which is the rotational axis between the joint 79 and the link 80, it is sufficient for the winding axis Pw forming the starting point of the reel 68w to be roughly parallel to the third primary rotational axis 95, but it is not required to coincide with the third primary rotational axis 95.

In the vicinity of the core member 168, there is disposed the cover member 168c disposed so as to surround a part of the side surface of the core member 168 having a cylindrical shape.

The part of the FPC 68 nearer to the other end than the part of the FPC 68 fixed to the first fixation section 68s of the core member 168 is wound in the predetermined direction taking the winding axis Pw roughly parallel to (in the present embodiment, roughly coincide with) the third primary rotational axis 95 as a starting point. Specifically, the FPC 68 is wound in a space between the core member 168 and the cover member 168c. Further, apart of the FPC 68 nearer to the other end than the part of the FPC 68 thus wound is fixed to a second fixation section 68e.

The core member 168, the cover member 168c, and the FPC 68 wound in the space between the core member 168 and the cover member 168c having the configurations described hereinabove constitute the reel 68w. Reciprocating displacement in the length direction of the FPC 68 due to the relative rotational movement between the joint 79 and the link 80 around the third primary rotational axis 95 is absorbed by the reel 68w of the FPC 68, and thus, the wiring structure not hindering the relative rotational movement is realized.

Then, the wiring path from the reel 68w toward the termination and so on will be explained.

In the link 80 as the second member and the link 81 coupled on the termination side of the link 80 shown in FIGS. 15A and 15B, the end effector (not shown) as the operating member for performing a predetermined operation is attached to the operating member attachment surface 81a as a third surface, which is a surface roughly parallel to the third primary rotational axis 95 located on the termination side of the link 81. As described above, as the end effector, there can be used a variety of types of effectors such as a grip mechanism such as a robot hand for gripping a component of a manufacture or the like, or a tool for performing a process such as soldering or welding in accordance with the purpose of using the robot 10.

Further, in the link 80, as the sub-operating member for performing an auxiliary operation of a predetermined operation to be performed by the end effector, there is disposed a camera 300 as an imaging element on a bottom surface 80b as a fourth surface, which is a surface perpendicular to the operating member attachment surface 81a in the direction of the bending-stretching rotation. The camera 300 is bonded to a camera substrate 310 disposed in the vicinity of the bottom surface 80b of the link 80. Further, the camera substrate 310 is provided with a connector 315 as a connection section to which the other end of the FPC 68 is connected.

A part of the FPC 68 nearer to the other end than a part of the FPC 68 fixed to the second fixation section 68e in the reel 68w is arbitrarily folded so that the other end extends toward the bottom surface 80*b* while keeping the principal surface parallel to the second surface 80*a*. Further, the FPC 68 passes through a wiring path 68*t* located between the reel 68*w* and the second surface 80*a*, and a connection terminal section on the other end of the FPC 68 is connected to the connector 315 of the camera substrate 310.

By adopting such a wiring path 68*t*, in the link 80 having only a limited space for the arrangement path of the FPC 68 due to the miniaturization of the robot 10, the wiring path 68*t* having the FPC 68 passing through the space between the FPC wound to form the reel 68*w* and the second surface 80*a* is used as a part of the arrangement path of the FPC 68. Thus, it is possible to ensure the arrangement path of the part of the FPC 68 nearer to the termination than the reel 68*w* in the limited space of the rotational joint (rotary joint) structure constituted by the joint 79 and the link 80.

Further, in the present embodiment, a recessed section 130 in which the FPC 68 is fitted is provided to the second surface 80*a* in the wiring path 68*t* located between the FPC 68 wound to form the reel 68*w* and the second surface 80*a* out of the wiring path of the flat cable from the reel 68*w* to the connector 315 as the connection section. According to this configuration, the wiring path 68*t* of the FPC 68 can be formed even in the case in which the space between the FPC 68 wound to form the reel 68*w* and the second surface 80*a* is extremely narrow, and at the same time, since the FPC 68 can be guided by the recessed section 130, the position of the FPC 68 in the wiring path 68*t* is stabilized.

The present embodiment is also characterized by the arrangement of the camera 300 as the sub-operating member with respect to the position of the end effector as the operating member. Specifically, the camera 300 is disposed so that a first imaginary line P1 connecting an operation center forming a base point of a predetermined operation to be performed by the end effector and the third primary rotational axis 95 to each other and an optical axis P2 of the camera 300 as the sub-operating member are roughly perpendicular to each other.

By making the control section 72 (see FIG. 1) operate the end effector to perform a predetermined operation on an operation target based on imaging information of the operation target obtained by the camera 300 arranged in such a manner, it is possible to move the end effector to a start position of the operation with good positional accuracy in a short time only by making a relative rotational movement between the joint 79 and the link 80 around the third primary rotational axis 95 out of the articulated arm of the robot 10, and then make the end effector perform the predetermined operation on the operation target based on positional information including a shape of the operation target and so on obtained by the camera 300.

It should be noted that although the wiring path 68*t* from the reel 68*w* to the connector 315 as the connection section to which the other end (the terminal) of the FPC 68 is connected is hereinabove explained, the other end side of another of the plurality of FPC 68 stacked on each other is drawn to the wiring relay section (not shown) inside the link 80 and so on, and reaches the connector (not shown) disposed on the relay board of the wiring relay section. From the wiring relay section, a wiring path by the FPC 68 is further formed (not shown) toward the end effector as the operating member.

According to the present embodiment, the arrangement path of the part of the FPC 68 nearer to the termination than the reel 68*w* is made clear in the limited space of the rotational joint (rotary joint) structure constituted by the joint 79 and the link 80 due to the miniaturization of the robot 10, and thus, the wiring structure corresponding to the miniaturization can be provided.

In particular, in the robot 10 having the articulated arm, since it is possible to provide the space-saving wiring structure corresponding to the miniaturization of the joint structure between the link 80 as the second member, which is a wrist section to be a dominant factor in particular for the miniaturization, and the joint 79 as the first member to be coupled on the base side of the link 80, it is possible to make a contribution to realization of the small-sized highly-functional articulated robot 10.

Modified Examples of Fifth Embodiment

Although the fifth embodiment of the invention made by the inventors is hereinabove explained specifically, the invention is not limited to the fifth embodiment described above, but can variously be modified within the scope or the spirit of the invention.

For example, although in the above description of the fifth embodiment, there is explained the configuration of using the FPC 68 as the flat cables as the wiring member, the invention is not limited to this configuration. For example, it is also possible to adopt a configuration using a so-called flat cable thicker and harder than the FPC 68, or other flat cables called harness.

Further, in the description of the fifth embodiment, there is explained the configuration provided with the recessed section 130, in which the FPC 68 is fitted, in the wiring path 68*t* located between the FPC 68 wound to form the reel 68*w* and the second surface 80*a*. Besides the above, in the case in which a space sufficient to dispose the wiring path 68*t* between the reel 68*w* and the second surface 80*a* can be ensured, or if it is not necessary to guide the FPC 68 in the wiring path 68*t*, the recessed section 130 can be eliminated.

Further, in the description of the fifth embodiment, there is explained the wiring path 68*t* of the FPC 68 from the reel 68*w* to the connector 315 as the connection section related to the camera 300 as the sub-operating member.

Besides the above, the wiring path 68*t* of the invention can also be applied to the wiring path from the reel 68*w* to the end effector as the operating member.

Further, although in the description of the fifth embodiment, there is explained the example of disposing the camera 300 as the sub-operating member disposed on the bottom surface 80*b*, the invention is not limited to this example, but a variety of operating members other than the camera 300 can be applied as the sub-operating member.

The sub-operating member denotes a member for performing an auxiliary operation of a predetermined operation to be performed by the end effector as the operating member. Further, the auxiliary operation performed by the sub-operating member denotes, for example, an operation of performing control of detecting the position and the state of the operation target prior to the predetermined operation (principal operation) performed by the end effector as the operating member, and then reflecting the detection information on the operation performed by the end effector, or an operation of washing, pressing, or gripping the operation target before, after, or before and after the predetermined operation performed by the end effector.

Hereinafter, some sub-operating members and usage examples in the robot 10 will be cited to explain.

For example, a laser displacement sensor can be used as the sub-operating member.

It is possible to perform control of measuring the displacement of the operation target before the predetermined operation is performed by the end effector using the laser displacement sensor as the sub-operating member disposed on the bottom surface 80b, then operating the end effector based on the measurement result to position the operation target to the start position of the predetermined operation.

Alternatively, it is possible to detect the shape such as dimensions of the operation target after the predetermined operation is performed by the end effector using the laser displacement sensor, and then determine whether the operation target is a non-defective product or a defective product based on a determination device (determination criterion) set in advance in a storage section of the control section 72, and then sort the operation target in accordance with the determination result.

Further, in the case of using a bar-code reader as the sub-operating member, it is possible to read the bar-code provided to the operation target to obtain the information related to the operation target, and then make the end effector perform the operation based on the information.

Further, an illumination such as an LED illumination can also be used as the sub-operating member. In the case in which, for example, the robot 10 is a dual-arm robot having two articulated arms coupled to the base, it is possible to perform an operation of making the end effector of one articulated arm perform an operation such as a pick-up operation while irradiating the operation target with an LED illumination from the other articulated arm side alternately switching between the right and left articulated arms.

The entire disclosures of Japanese Patent Application Nos. 2013-226541, filed Oct. 31, 2013, 2013-226543, filed Oct. 31, 2013 and 2013-226544, filed Oct. 31, 2013 are expressly incorporated by reference herein.

What is claimed is:

1. A robot comprising:
    a first member;
    a second member rotating around a primary rotational axis with respect to the first member; and
    a wiring board provided to the first member and having a connection section connected to a plurality of first ends of a plurality of flat cables,
    wherein the plurality of flat cables form a reel at a plurality of second ends of the plurality of flat cables and the reel is provided in the second member,
    the plurality of second ends of the plurality of flat cables are fixed to the second member and wound around the primary rotational axis to form the reel,
    a direction of a tension acting on the plurality of second ends of the plurality of flat cables when a tension acts on the plurality of first ends of the plurality of flat cables is different from an insertion direction of the plurality of flat cables in the connection section,
    the plurality of first ends of the plurality of flat cables are connected to the connection section along a first axis parallel to the primary rotational axis,
    the plurality of flat cables include at least a flat cable for a power line and a flat cable for a signal line,
    the flat cable for the power line overlaps the flat cable for the signal line so as to have a larger distance than the flat cable for the signal line, and
    one of an insulating member and a shield member having a shape similar to the plurality of flat cables is disposed between the flat cable for the power line and the flat cable for the signal line.

2. The robot according to claim 1, wherein
    the connection section is disposed on a first surface of the wiring board, which is a surface roughly perpendicular to the primary rotational axis, and
    the insertion direction of the flat cable in the connection section is different from a direction parallel to the first surface.

3. The robot according to claim 2, wherein the insertion direction of the plurality of flat cables in the connection section is a direction roughly perpendicular to the first surface.

4. The robot according to claim 2, wherein a lid member having an inner wall surface opposed to the first surface is installed to the first member, and
    the inner wall surface has contact with the plurality of flat cables in a vicinity of the connection section.

5. The robot according to claim 4, wherein the connection section includes a lock lever adapted to lock the plurality of flat cables by being pressed into the connection section in the insertion direction after inserting the plurality of flat cables, and
    the inner wall surface has contact with the lock lever.

6. The robot according to claim 4, wherein the inner wall surface has concavity and convexity including a projection section projecting toward the first surface, and the projection section has contact with one of a reinforcing member, a lock lever, and the reinforcing member and/or the lock lever.

7. The robot according to claim 2, wherein the plurality of flat cables are installed between the connection sections and the reel in an overlapping manner, and
    the connection sections are arranged side by side so that longitudinal directions of the connection sections are perpendicular to an extending direction of the plurality of flat cables toward the connection sections.

8. The robot according to claim 7, wherein
    a rotational center axis of the reel and centers of the respective connection sections are aligned with each other in a planar view of the first surface.

9. The robot according to claim 1, further comprising:
    a reinforcing member harder than the plurality of flat cables disposed on a connection terminal section of the plurality of flat cables to be connected to the connection section.

* * * * *